US009112685B2

United States Patent
Gage et al.

(10) Patent No.: US 9,112,685 B2
(45) Date of Patent: Aug. 18, 2015

(54) MECHANISMS FOR DIRECT INTER-DEVICE SIGNALING

(71) Applicant: BlackBerry Limited, Waterloo (CA)

(72) Inventors: William Anthony Gage, Stittsville (CA); Masoud Ebrahimi Tazeh Mahalleh, Ottawa (CA); Biswaroop Mukherjee, Stittsville (CA); Robert Novak, Stittsville (CA)

(73) Assignee: BlackBerry Limited, Waterloo, Ontario (CA)

( * ) Notice: Subject to any disclaimer, the term of this patent is extended or adjusted under 35 U.S.C. 154(b) by 159 days.

(21) Appl. No.: 13/891,498

(22) Filed: May 10, 2013

(65) Prior Publication Data

US 2014/0334392 A1 Nov. 13, 2014

(51) Int. Cl.
| | | |
|---|---|---|
| *H04J 1/00* | (2006.01) | |
| *H04W 4/00* | (2009.01) | |
| *H04L 5/14* | (2006.01) | |
| *H04L 5/00* | (2006.01) | |

(52) U.S. Cl.
CPC ............ *H04L 5/1469* (2013.01); *H04L 5/0092* (2013.01); *H04L 5/0023* (2013.01); *H04L 5/0048* (2013.01); *H04L 5/0053* (2013.01); *H04L 5/0082* (2013.01)

(58) Field of Classification Search
None
See application file for complete search history.

(56) References Cited

U.S. PATENT DOCUMENTS

| | | | | |
|---|---|---|---|---|
| 2008/0188177 | A1* | 8/2008 | Tan et al. | 455/11.1 |
| 2009/0073902 | A1* | 3/2009 | Astely et al. | 370/280 |
| 2011/0255450 | A1* | 10/2011 | Wang et al. | 370/280 |
| 2011/0268006 | A1* | 11/2011 | Koskela et al. | 370/312 |
| 2012/0106517 | A1* | 5/2012 | Charbit et al. | 370/336 |
| 2013/0223353 | A1* | 8/2013 | Liu et al. | 370/329 |
| 2013/0322413 | A1* | 12/2013 | Pelletier et al. | 370/336 |
| 2014/0153390 | A1* | 6/2014 | Ishii et al. | 370/230 |

FOREIGN PATENT DOCUMENTS

WO 2013181515 A2 12/2013

OTHER PUBLICATIONS

Novak, Robert, et al.; U.S. Appl. No. 13/723,926, filed Dec. 21, 2012, Title: Network-Managed Direct Device to Device Communications.
Novak, Robert, et al.; U.S. Appl. No. 13/724,020, filed Dec. 21, 2012, Title: Network-Managed Direct Device to Device Communications.
(Continued)

*Primary Examiner* — Edan Orgad
*Assistant Examiner* — Sithu Ko
(74) *Attorney, Agent, or Firm* — Conley Rose, P.C.; J. Robert Brown, Jr.

(57) ABSTRACT

Described herein is a user equipment comprising a processor configured to: derive a plurality of virtual subframes from an allocation of radio resources, the virtual subframes comprising a virtual special subframe and a virtual forward link subframe wherein the virtual forward link subframe comprises a first forward link portion and the virtual special subframe comprises one or more of: a second forward link portion, and a reverse link portion; transmit, via a direct device to device (DD2D) link, to a second user equipment during the first forward link portion; and receive, via the DD2D link, from the second user equipment during the reverse link portion.

21 Claims, 14 Drawing Sheets

(56) References Cited

OTHER PUBLICATIONS

Ebrahimi Tazeh Mahalleh, Masoud, et al.; U.S. Appl. No. 13/854,515, filed Apr. 1, 2013, Title: Aligning Timing for Direct Communications.
3GPP TR 22.803 V12.1.0; 3rd Generation Partnership Project; Technical Specification Group Services and System Aspects; Feasibility Study for Proximity Services (ProSe); Release 12, Mar. 2013; 45 pages.
3GPP TS 36.211 V11.2.0; 3rd Generation Partnership Project; Technical Specification Group Radio Access Network; Evolved Universal Terrestrial Radio Access (E-UTRA); Physical Channels and Modulation; Release 11; Feb. 2013; 109 pages.
3GPP TS 36.212 V11.2.0; 3rd Generation Partnership Project; Technical Specification Group Radio Access Network; Evolved Universal Terrestrial Radio Access (E-UTRA); Multiplexing and Channel Coding; Release 11; Feb. 2013; 82 pages.
3GPP TS 36.213 V11.2.0; 3rd Generation Partnership Project; Technical Specification Group Radio Access Network; Evolved Universal Terrestrial Radio Access (E-UTRA); Physical Layer Procedures; Release 11; Feb. 2013; 173 pages.
3GPP TS 36.300 V11.5.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Mar. 2013; 209 pages.
3GPP TS 36.321 V11.2.0; 3rd Generation Partnership Project; Technical Specification Group Radio Access Network; Evolved Universal Terrestrial Radio Access (E-UTRA); Medium Access Control (MAC) Protocol Specification; Release 11; Mar. 2013; 56 pages.
3GPP TS 36.331 V11.3.0; 3rd Generation Partnership Project; Technical Specification Group Radio Access Network; Evolved Universal Terrestrial Radio Access (E-UTRA); Radio Resource Control (RRC); Protocol Specification; Release 11; Mar. 2013; 344 pages.
3GPP TSG RAN Meeting #58; "Study on LTE Device to Device Proximity Services"; RP-122009; 6 pages.
3GPP TSG-RAN2 Meeting #58; "Corrections on Modulus Base in UM in RLC"; R2-072267; Kobe, Japan; May 7-11, 2007; 2 pages.
Fodor, Gabor, et al.; "Design Aspects of Network Assisted Device-to-Device Communications"; IEEE; Mar. 2012; 8 pages.
IEEE Standards Association; "Part 11: Wireless LAN Medium Access Control (MAC) and Physical Layer (PHY) Specifications Amendment 2: MAC Enhancements for Robust Audio Video Streaming"; IEEE Std. 802.11aa; IEEE Computer Society; May 29, 2012; 162 pages.
PCT International Search Report; Application No. PCT/US2013/040512; Jan. 20, 2014; 4 pages.
PCT Written Opinion of the International Searching Authority; Application No. PCT/US2013/040512; Jan. 20, 2014; 6 pages.

\* cited by examiner

MECHANISMS FOR DIRECT INTER-DEVICE SIGNALING

FIELD OF THE DISCLOSURE

The present disclosure relates to wireless device-to-device (D2D) communications, and in particular, relates to control signaling between devices engaged in direct device-to-device communications.

BACKGROUND

When two wireless devices (WD) in a cellular system wish to exchange information, the information may be transmitted on an uplink from the source WD to the network and then echoed on a downlink from the network to the destination WD; this mode of operation may be referred to as Indirect Device-to-Device (ID2D) communications. While information may be routed through the network if the communicating devices are far enough apart that they are beyond the reach of their transmitters, routing through the network may also occur in some cellular networks even if the devices are in close proximity to each other. It may be beneficial to define a mode of operation that enables Direct Device-to-Device (DD2D) communications between wireless devices that are in close proximity (e.g. close enough to be within the reach of each other's transmitters) thus avoiding the route through the network.

As used herein, the term "user equipment" (alternatively "UE") might in some cases refer to mobile devices or wireless devices such as mobile telephones, personal digital assistants, handheld or laptop computers, and similar devices that have telecommunications capabilities. The terms UE, mobile device, and wireless device may be used interchangeably herein. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any component that can terminate a communication session for a user. Also, the terms "user equipment," "UE," "user agent," "UA," "user device," "wireless device", "WD", and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a wireless access point, or a similar component. As used herein, the term "base station" refers to any component of the wireless network, such as a traditional base station, a wireless access point, or an LTE or LTE-A node B or eNB, that creates a geographical area of reception and transmission coverage allowing a UE or a relay node to access other components in a telecommunications system. The geographical area of reception and transmission coverage provided by a base station may be referred to herein as a cell.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

In some cells, two wireless devices may engage in an inter-device session (IDS). For example, the two wireless devices may communicate directly with one another over a radio channel without communicating through a base station. In some embodiments, a base station may allocate radio resources to the IDS for use by the wireless devices. Once radio resources for a Direct Device-to-Device (DD2D) communications channel have been allocated to the IDS by a base station, the wireless devices may use elements of that channel to exchange information related to signal quality, modulation and coding, transmit power, transmission status, and other facets of the DD2D communication. In some embodiments, the radio resource allocation for a DD2D link only allows a half-duplex mode of communications. In these scenarios, the resources of the DD2D link may be allocated to the forward link (transmitter) for some period of time for the transmission of control information and user data and then to the reverse link (receiver) for another period of time for the transmission of control information. In addition, the role of transmitter may be coordinated amongst the participants in the IDS such that each receiver in a point-to-multipoint connection has the ability to assume the transmitter role in a timely fashion.

Control information may be exchanged between Devices using a combination of physical (PHY) (Layer 1) signals and medium access control (MAC) (Layer 2) messages. Some information may be exchanged in-band, along with user data, while other information may be exchanged in a separate but dedicated side-band channel.

Figure 1:
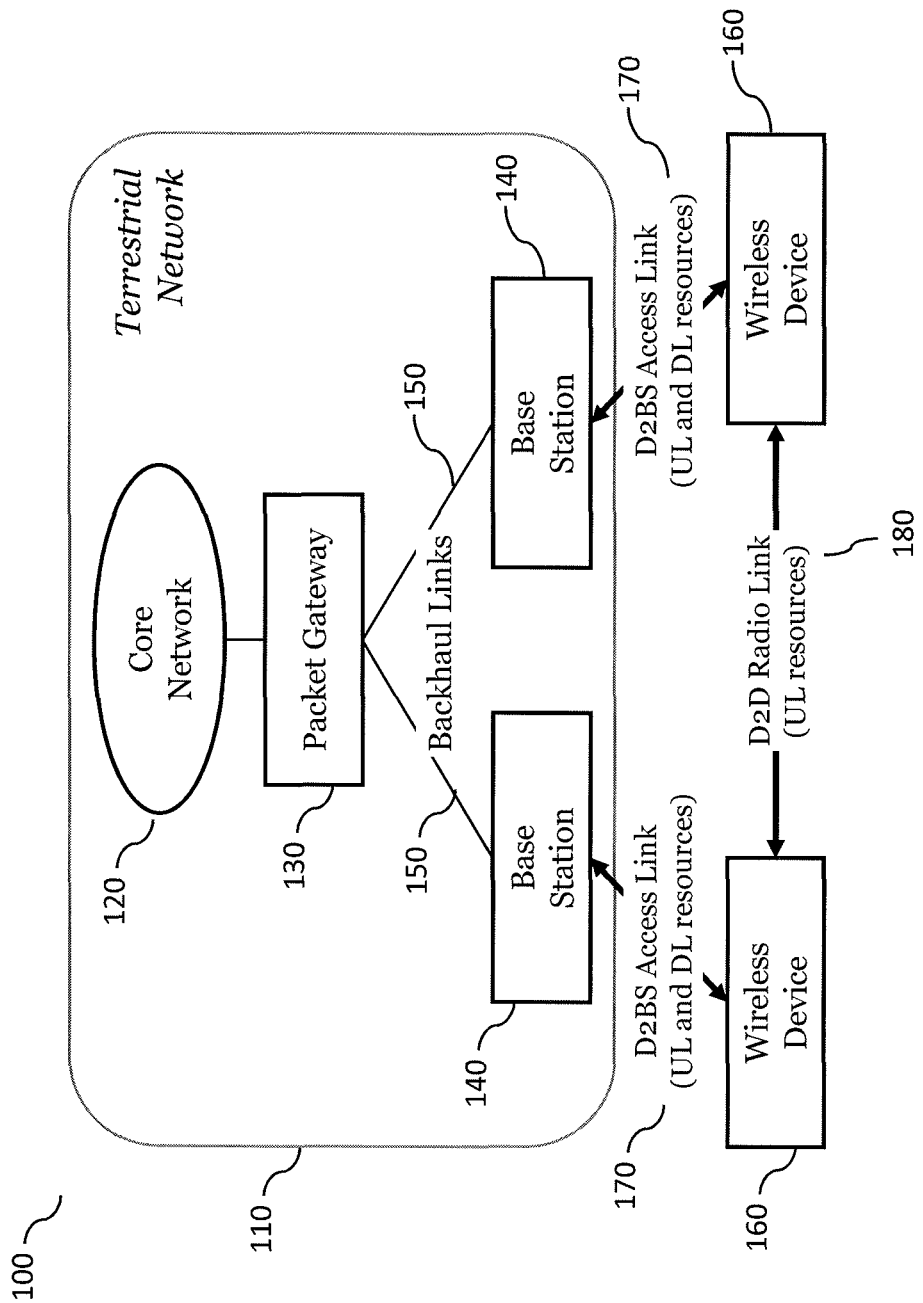
FIG. 1 is a diagram of a network topology.

FIG. 1 is a diagram of an embodiment of a wireless network 100. Wireless network 100 may comprise a terrestrial network 110 and one or more wireless devices 160. The terrestrial network 110 may comprise a core network 120, packet gateway 130, and base stations 140. Terrestrial network 110 may comprise more than one core network 120, packet gateway 130, and base station 140. Wireless devices 160 may be connected to base stations 140 via a device to base station (D2BS) link 170. Base stations 140 may be connected via backhaul links 150 to the rest of the cellular operator's terrestrial network infrastructure. Wireless devices 160 may be connected directly via a device to device (D2D) link 180.

Radio resources in uplink and/or downlink spectrum may be used for D2D links in a macro cellular system. In some embodiments, use of only uplink radio resources (e.g. LTE Physical Uplink Shared Channel, PUSCH) may be used to minimise interference inflicted on other devices in the vicinity of a D2D transmitter. In the case where only uplink radio resources are used, time division duplexing of DD2D radio resources may be possible with a Wireless Device able to both transmit and receive over uplink radio resources. Depending on the availability of radio resources and on the capabilities of a wireless device, DD2D communications may be performed either in full duplex mode or in half duplex mode.

In a basic point-to-point (PTP) communications model, there may be one device performing the role of transmitter and one device performing the role of receiver. If spectrum is available in multiple bands, then a device may be able to simultaneously transmit in one band and receive in another band (frequency division duplexing, FDD), enabling a full duplex mode of communications between devices. In particular, radio resources for transmissions by one device may be allocated in one band while resources for transmissions by the other device are allocated in another band. In this mode, a device may simultaneously perform both a transmitter and a receiver role. If spectrum is available only in one band (or if spectrum is available in multiple bands but a device has only one transmit/receive chain), then a device may only be able either to transmit or to receive at any given time (time division duplexing, TDD), resulting in a half duplex mode of communications between devices. In particular, the radio resources may be allocated to the transmitter for some period of time for the transmission of user data (and transmitter control information) on the forward link from the transmitter to the receiver and then allocated to the receiver for another period of time for the transmission of receiver control information on the reverse link from the receiver to the transmitter. Coordination between the communicating devices may be required to change between the transmitter and receiver roles.

Figure 2:
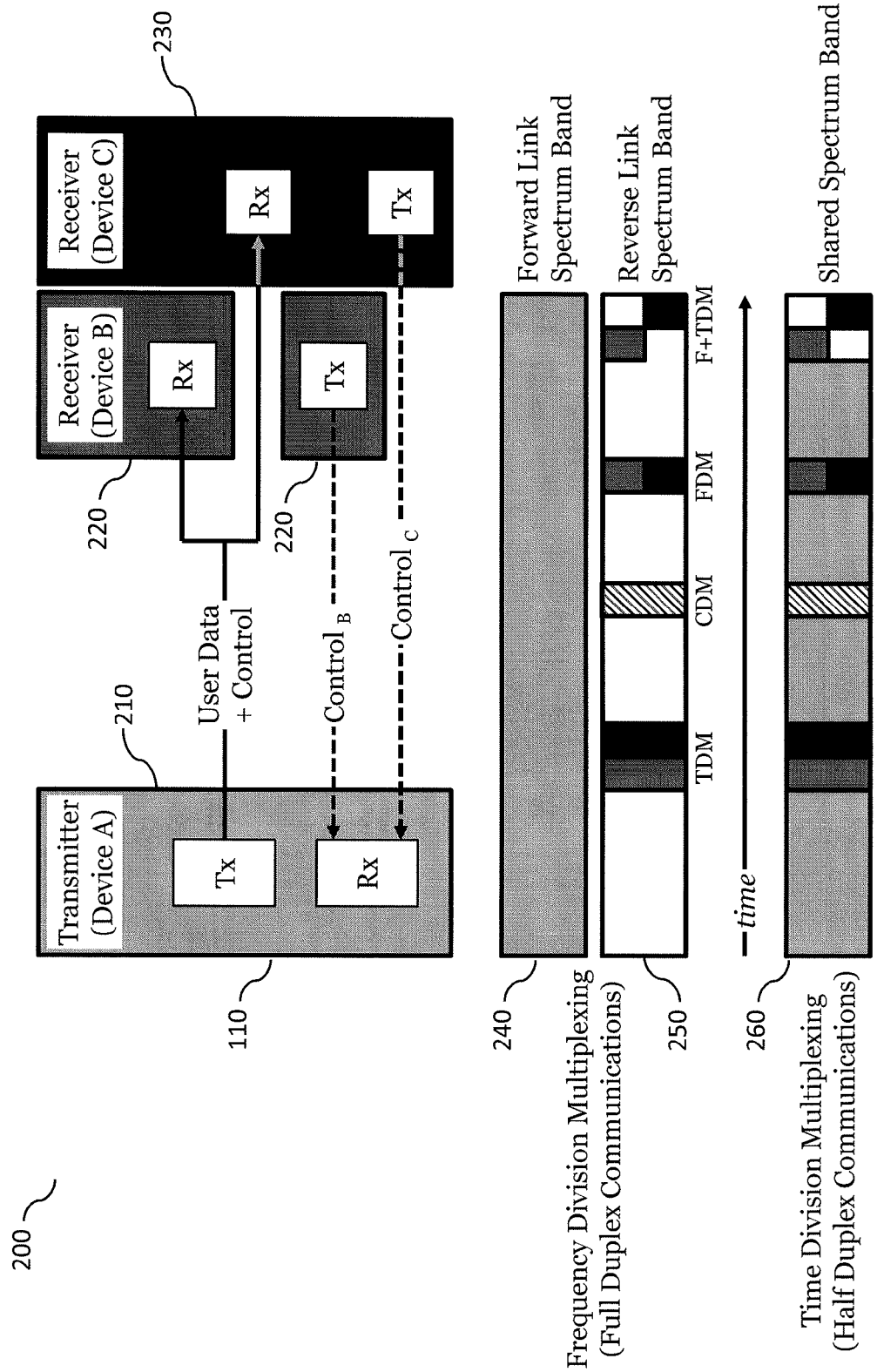
FIG. 2 is diagram of point to multipoint resource sharing.

FIG. 2 is a diagram of a point-to-multipoint (PTM) communication model 200. PTM communication model comprises a device acting as a transmitter 210 and two devices acting as receivers 220, 230. While two receivers 220, 230 are depicted, any number of devices may act as PTM receivers.

If spectrum is available in multiple bands, transmitter 210 may simultaneously transmit in one band and receive in another band. User data (and transmitter control information) may be transmitted on the forward link 240 by the transmitter 210 in one band while receiver control information may be transmitted on the reverse link 250 by receivers 220, 230 in another band. The sharing of spectrum by receivers 220, 230 using the reverse link 250 may require time, frequency, and/or code division multiplexing of resources within that spectrum to ensure that each receiver 220, 230 has exclusive access to its transmission resources for some period of time. In some embodiments, a device may simultaneously perform both a transmitter and a receiver role.

If spectrum is available only in one band, transmitter 210 may either transmit or receive at any given time. Radio resources of shared spectrum band 260 may be allocated to the transmitter 210 for some period of time for the transmission of user data (and transmitter control information) on the forward link and then allocated to one or more of the receivers 220, 230 for other periods of time for the transmission of receiver control information on their respective reverse links. Coordination between the communicating devices may be required to change the transmitter and receiver roles.

In some embodiments, it may be necessary to make reference to a particular wireless device within an IDS. In these embodiments, each device may be assigned a short Session Device Identifier that uniquely identifies the device within a particular IDS; this may, for example, be a UE session ID or an LTE Radio Network Temporary Identifier (RNTI). If a wireless device contemporaneously participates in multiple inter-device sessions, it may be assigned a different Session Device Identifier within each of the sessions.

Two types of channels may be defined for transporting control information between wireless devices. First, a side band channel utilises radio resources that are assigned exclusively for transporting control information; these resources may not be used for transporting user information between devices. An LTE Physical Uplink Control Channel (PUCCH) is an example of a side band channel. Second, an in band channel utilises a common set of radio resources where control information is carried along with, or piggy-backed onto, user information. LTE MAC Control Elements represent one form of in-band control signalling.

In some embodiments, the exchange of control information between devices may use a side-band channel exclusively. In some embodiments, the exchange of control information between devices may use an in-band channel exclusively. In further embodiments, the exchange of control information between devices may use a side-band channel for the exchange of one set of information and an in-band channel for the exchange of another set of information.

Transmission of control information in a side-band channel may make use of a more robust modulation and coding scheme (MCS) than the MCS used for user information transmissions. In addition, control information error detection and recovery procedures may also be different from those employed for user information. In some embodiments, an in-band channel may benefit from the error control scheme used to protect user information (e.g. HARQ); where a side-band channel may require a separate error control scheme.

Three types of side-band channels may be defined for transporting control information: a common side band channel, a dedicated side band channel, and a physical layer piggy-backing. A common side-band channel may carry several types of control information (e.g. ACK/NAK and CSI). As a result, protocol overhead may be required to distinguish between the various information elements that may be transported over the channel. This overhead may, for example, take the form of a type field associated with each element, or space may be reserved for each element in a structure with a fixed, predefined format. A dedicated side-band channel may carry only one type of information (e.g. an ACK/NAK). Since there is no need to distinguish the transported control information from other types of control information, overhead information such as type fields may be eliminated. Physical layer piggy-backing may multiplex physical layer control information (e.g. ACK/NAK and CSI) together with user information in one set of physical layer resources. An example of physical layer piggy-backing may be found in LTE where ACK/NAK and/or CSI may be multiplexed into resource blocks occupied by Primary Uplink Shared Channel (PUSCH). ACK/NAK and CSI may be carried in dedicated side-band channels, as they may be separately multiplexed into different sets of resource elements. By contrast, non-piggy backed physical layer control information in LTE may be exemplified by transmission of ACK/NAK and/or CSI on PUCCH.

In some embodiments, a set of dedicated side-band channels may be created by sharing common radio resources through time, frequency and/or code division multiplexing according to some pre-defined sharing arrangement. Side-band channel examples include LTE Physical Uplink Control Channel (PUCCH), ACK/NAK and CSI multiplexed onto Physical Uplink Shared Channel (PUSCH), and Physical Downlink Control Channel (PDCCH).

An in-band channel may carry several types of control information (e.g. BSR) as well as user information. Two techniques may be employed for transporting control information along with user information: higher layer piggy backing and interleaving. Higher layer piggy-backing adds a control header to user protocol data units (PDUs). In order to minimise protocol overhead, only a small amount of control information may be piggy-backed onto the PDUs. The IETF Transport Control Protocol (TCP) is an example of the use of higher layer piggy-backed signalling. Interleaving may transmit control PDUs separately from user PDUs; different types of control information may be transmitted in distinct PDUs. As a result, protocol overhead (e.g. a type field) may be required to distinguish between the various PDUs that may be transported over the channel. The LTE MAC uses interleaving to distinguish Control Elements from other MAC PDUs.

Two types of control channel information may be defined herein: transmitter control information (TxCI) and receiver control information (RxCI). TxCI may be sent from a transmitter of user data to a receiver of user data and RxCI may be sent from a receiver of user data to a transmitter of user data. In a macro cellular system (e.g. LTE) where the base station controls many aspects of the uplink transmissions (as well as downlink transmissions), TxCI may be provided to a transmitting device by the base station as Downlink Control Information (DCI) or as a Downlink MAC Control Element. RxCI in the form of feedback may be provided by a wireless device to a base station as Uplink Control Information (UCI) or as an Uplink MAC Control Element.

Table 1 identifies various transmitter control information elements defined in LTE and their origin (BS or WD) when the transmitter (Tx) is the base station (e.g. eNB) and when the transmitter is the wireless device (e.g. UE).

TABLE 1

LTE Transmitter Control Information Elements

| TxCI | Description | Tx = BS | Tx = WD |
| --- | --- | --- | --- |
| BSR | Buffer Status Report | N/A | WD |
| HARQ-T | HARQ process number, NDI, RV | BS | BS |
| MCS | Modulation and Coding Scheme | BS | BS |
| TPMI | MIMO precoding information | BS | BS |
| SRS-REQ | Sounding Reference Signal request | BS | N/A |
| TP-HR | Transmit Power Head Room | N/A | WD |

LTE transmitter control information (TxCI) may include: BSR identifies the volume of information enqueued at the WD; HARQ-T is the HARQ-related information (to be) used by the transmitter, this may comprise the HARQ process number, new data indicator (NDI) and redundancy version (RV); MCS defines the modulation and coding scheme (to be) used by the transmitter; TPMI defines the MIMO precoding (to be) used by the transmitter; SRS-REQ is a request by the BS for transmission of a Sounding Reference Signal by the WD; TP-HR defines the transmit power headroom available at the transmitter (WD).

Table 2 identifies various receiver control information elements defined in LTE and their origin (BS or WD) when the transmitter (Tx) is the base station (e.g. eNB) and when the transmitter is the wireless device (e.g. UE).

TABLE 2

LTE Receiver Control Information Elements

| RxCI | Description | Rx = BS | Rx = WD |
| --- | --- | --- | --- |
| CQI | Channel Quality Indication | N/A | WD |
| HARQ-R | ACK/NAK | BS | WD |
| PMI | Precoding Matrix Indication | N/A | WD |
| RLF | Radio Link Failure | N/A | WD |
| SR | Scheduling Request | N/A | WD |
| SRS | Sounding Reference Signal | N/A | WD |
| TA | Timing Advance | BS | N/A |
| TPC-C | Transmit Power Control for PUCCH | BS | N/A |
| TPC-S | Transmit Power Control for PUSCH | BS | N/A |

LTE receiver control information (RxCI) may include: CQI contains information on the quality of the (DL) channel as seen by the receiver (WD); HARQ-R is an indication of whether a transmission has been successfully received (ACK) or not (NAK); PMI reflects the MIMO precoding suggested by the receiver (WD) based on current channel state information; RLF is an indication that signal quality has degraded to the point where on-going communications may not be possible; SR indicates a Scheduling Request from a receiver (WD) to obtain radio resources for a pending transmission; SRS is a Sounding Reference Signal transmitted by a WD and used by the BS to make decisions related to its transmission of downlink information; TA defines the timing advance to be applied at the transmitter (WD) to align signals at the receiver (BS); TPC-C controls transmit power to be used by a WD for PUCCH (control plane) transmissions; TPC-S controls transmit power to be used by a WD for PUSCH (user plane) transmissions.

Figure 3:
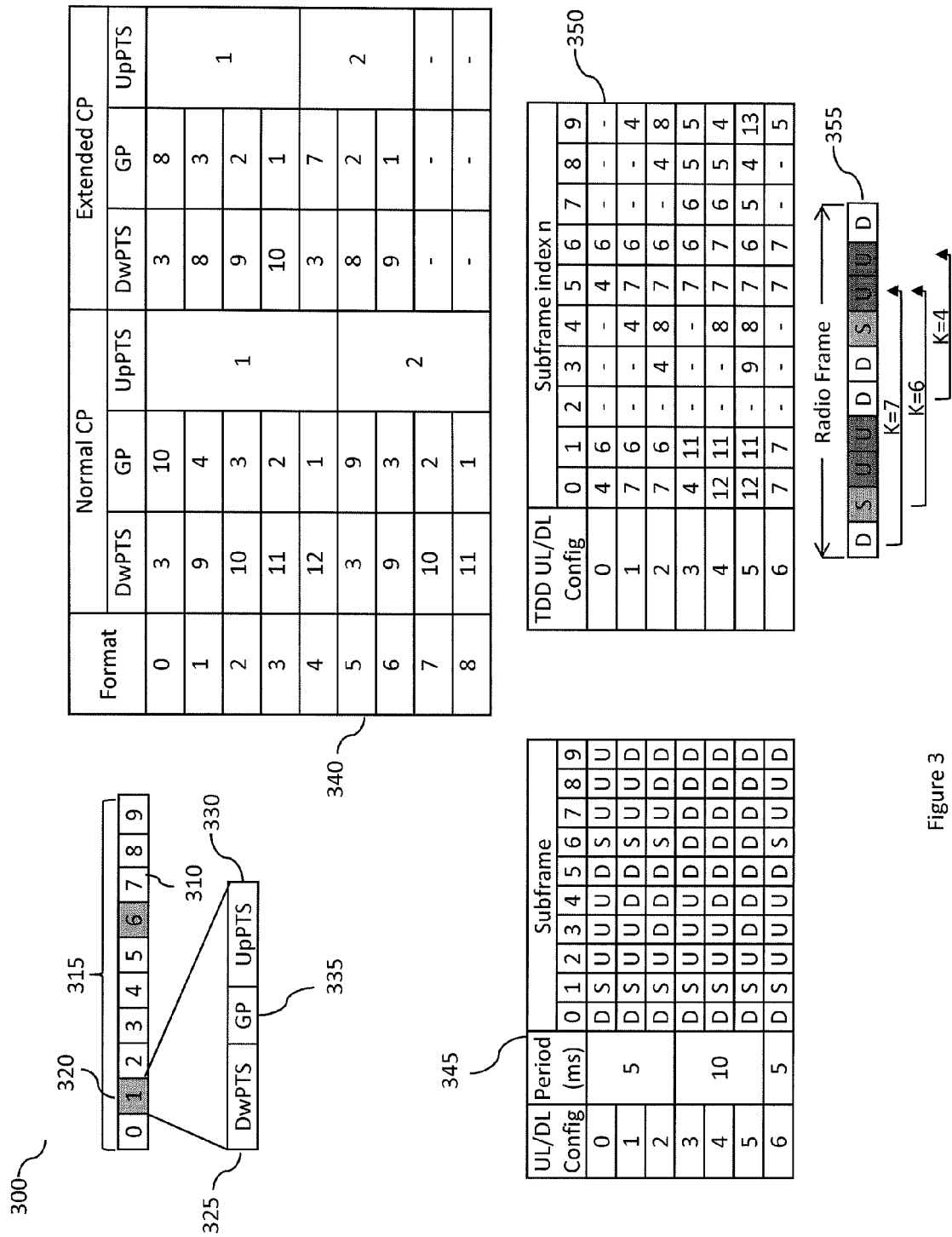
FIG. 3 is a diagram of an LTE time-division duplex (TDD) frame structure.

In LTE, frame structure type 2 may be used in unpaired spectrum where time division duplexing (TDD) is required to provide uplink and downlink resources. FIG. 3 is a diagram of an LTE TDD frame structure. Each subframe 310 within a 10 millisecond radio frame 315 is designated as either a downlink subframe, an uplink subframe, or a special subframe. A special subframe 320 may comprise a downlink period 325, an uplink period 330, and a guard period 335; during the guard period 335, a transition may be made from downlink (transmissions by the eNB) to uplink (transmissions by the UE).

The format of the special subframe 320 may specify the number of symbols allocated to downlink, uplink, and guard periods 325, 330, 335 within the special subframe 320. The format may be determined by the eNB and signalled to the UEs in a System Information Block (SIB). Various special subframe formats are shown in subframe format table 340. Similarly, the configuration of the TDD radio frame, specifying the number of downlink subframes (D), uplink subframes (U), and corresponding special subframes (S), may also determined by the eNB and signalled to the UEs in a SIB. Various TDD radio frame configurations are shown in TDD radio frame configuration table 345.

When the eNB transmits downlink information in subframe n, HARQ ACK/NAK feedback is synchronously provided by the UE in subframe n+k where the value of k is determined from the TDD configuration table 350; a similar subframe timing map is defined for eNB HARQ feedback to UE uplink transmissions. AS an example, a format 1 radio frame is provided. According to the TDD configuration table 350, for subframe 0 of the radio frame format 1 355 k=7. Thus feedback is transmitted in the seventh subframe following subframe 0. The eNB may dynamically change the configuration of downlink and uplink subframes in a TDD radio frame according to the observed volume of uplink and downlink traffic. In a single frequency network, the downlink and uplink periods may be coordinated amongst neighbouring cells to avoid interference, essentially leading to use of the same, semi-static, TDD configuration throughout the network.

Defined herein are procedures and mechanisms for signalling control information directly between Wireless Devices engaged in an inter-device session (IDS). Some information may be exchanged in-band, along with user data, while other information may be exchanged in a separate but dedicated side-band channel.

In some embodiments, the radio resources for a Direct Device-to-Device Control Channel (DDCCH), used for the exchange of control information, and for a Direct Device-to-Device Data Channel (DDDCH), used for the exchange of user information, are allocated from the uplink radio resources of a cell in order to minimise inter-cell interference. The described procedures and mechanisms may, however, be applied to embodiments utilising the downlink radio resources of a cell and to embodiments utilising a combination of uplink and downlink radio resources.

In contrast to a macro cellular system (e.g. LTE) where a base station controls many aspects of the uplink transmissions (as well as downlink transmissions), the devices participating in an IDS may be peers. In the embodiments of this document, the control information provided by a device may be based on the role of a wireless device, i.e. transmitter or receiver, within an IDS. This may allow the control channel structure to be tailored to the intended role and also may allow the procedures to be used in both point-to-point and point-to-multipoint transmission topologies.

This may be achieved through several procedures and mechanisms: a DD2D frame structure incorporating forward link subframes (transmitter to receivers) and a special subframe with a reverse link (receiver to transmitter) allocation for exchanging control information; a mapping of virtual DD2D subframes onto physical subframes that may be dynamically allocated to the IDS by the base station; a means for dynamically determining the placement of a special subframe that meets real-time timing constraints for providing receiver feedback; a partitioning of control information into categories whereby each category may be coded and transmitted independently of other categories; in a half-duplex mode of communications, a means for identifying which receivers in the IDS have enqueued data to transmit and for transferring the role of transmitter to one of those devices; in a half-duplex mode of communications, a means for a transmitter to dynamically request feedback and for a receiver to provide bundled feedback; in a half-duplex mode of communications, a means for a transmitter to dynamically select a different modulation and coding scheme to be used for forward link transmissions and to coordinate use of the selected MCS with the receivers; a means for maintaining a dormant state in an IDS and for transitioning to an active transmission state.

In some embodiments described herein, it may be assumed that appropriate D2D radio resources have been selected by the base station(s) serving the wireless devices and assigned to the devices engaged in the inter-device session (IDS), and that transmissions between the devices in the IDS have been properly aligned in time and frequency. Radio resources may be allocated from the uplink radio resources of a cell; as a consequence, information exchange in an IDS may use a half-duplex mode of communications where, at any given time, there may be (at most) one transmitter within an IDS and the role of transmitter may be coordinated amongst the devices participating in that IDS. A Device that is not designated as the transmitter is assumed to be a receiver within the IDS. The mechanisms and procedures described in this document may, however, be adapted for use in embodiments using downlink resources or a combination of uplink and downlink resources in either a half-duplex or full-duplex mode of communications.

In some embodiments, a DD2D link may comprise forward link allocations and reverse link allocations. A forward link carries information from a Transmitter to one or more Receivers. On the forward link, a Transmitter may send user information via a direct device to device control channel (DDDCH), transmitter control information via a transmitter control channel (TxCCH), or a combination of both. A reverse link may carry information from a receiver to a transmitter. On the reverse link, a receiver may only send receiver control information via a receiver control channel (RxCCH). The physical radio resources to be used by the devices engaged in an IDS may be assigned by a base station. The devices may then determine dynamically, amongst themselves, whether those resources will be used to transport forward link information or reverse link information. In embodiments using a half-duplex mode of communications, the resources of the DD2D link may be allocated to the forward link for some period of time and then to the reverse link for another period of time. In some embodiments, subframes on the DD2D link are virtual and consecutive virtual subframes are only contiguous within the context of a DD2D link; virtual DD2D subframes are then mapped onto the physical radio resources allocated to the DD2D link by the Base Station.

Figure 4:
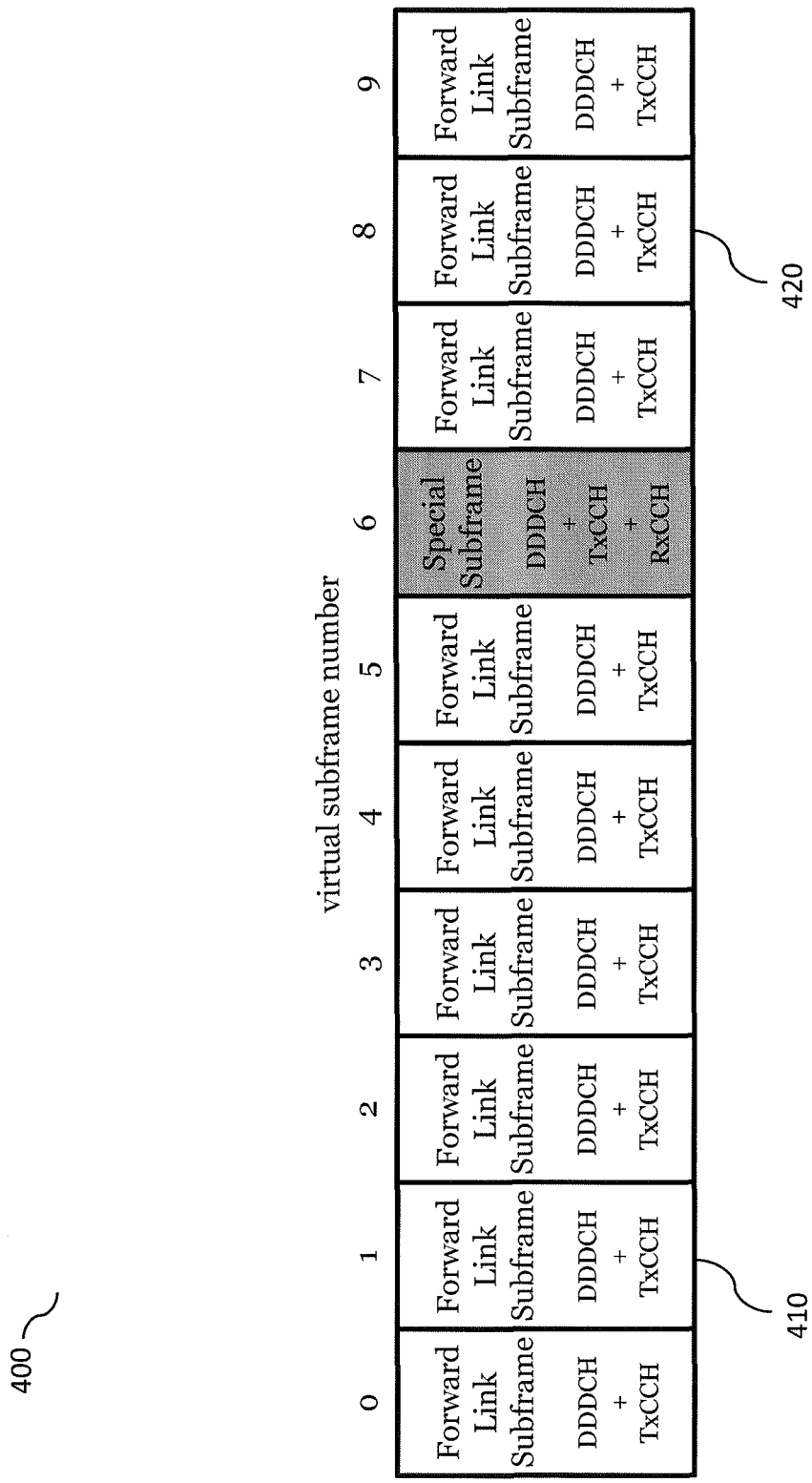
FIG. 4 is a diagram of a Direct Device to Device (DD2D) frame structure.

In some embodiments, a DD2D (virtual) frame is comprised of two types of (virtual) subframes. FIG. 4 is a diagram of a DD2D virtual frame structure 400. The DD2D virtual frame may comprise one or more forward link subframes (FLSF) 410 and one or more special subframes (SSF) 420. While only one special subframe 420 is depicted, any number of special subframes 420 may be used based upon IDS requirements. FLSF 410 may be dedicated for use by the designated transmitter within an IDS, while SSF 420 may comprise forward link transmission opportunities (e.g. for a DDDCH and/or a TxCCH) as well as reverse link transmission opportunities (e.g. for a RxCCH). In some embodiments, SSF 420 may comprise only reverse link transmission opportunities.

In some embodiments, a SSF may occur at regular intervals according to a subframe pattern that is-made-known-to both the Transmitter and the Receiver. As used herein, is-made-known-to may refer to information that may be pre-configured into a wireless device, or broadcast to all devices by the base station (e.g. in a System Information Block, SIB), or communicated individually to each device by the base station (e.g. via Radio Resource Control (RRC) signalling). This embodiment may be used, for example, when traffic patterns can be predicted (e.g. for streaming audio or video, or for voice telephony).

In some embodiments, the transmitter may explicitly send a feedback request indication on the TxCCH in subframe j to indicate that subframe k(k≥j+m) will be a SSF where the transmitter will expect to receive feedback from the receiver; the value of m is-made-known-to both the transmitter and receiver. This embodiment may be used, for example, when traffic patterns are unpredictable and bursty.

In some embodiments, a Forward Link Format Indicator (FLFI) may be encoded in each forward link subframe. The FLFI may identify the Transmitter Control Information contained in this FLSF and, by implication, the structure of the FLSF. The location of the FLFI is-made-known-to both the transmitter and the receivers; it may, for example, be encoded across a set of resource elements in a FLSF that encompass one or more symbols of the FLSF and one or more subcarriers of the FLSF. The FLFI may also be used to distinguish between a forward link subframe and a special subframe.

Figure 5:
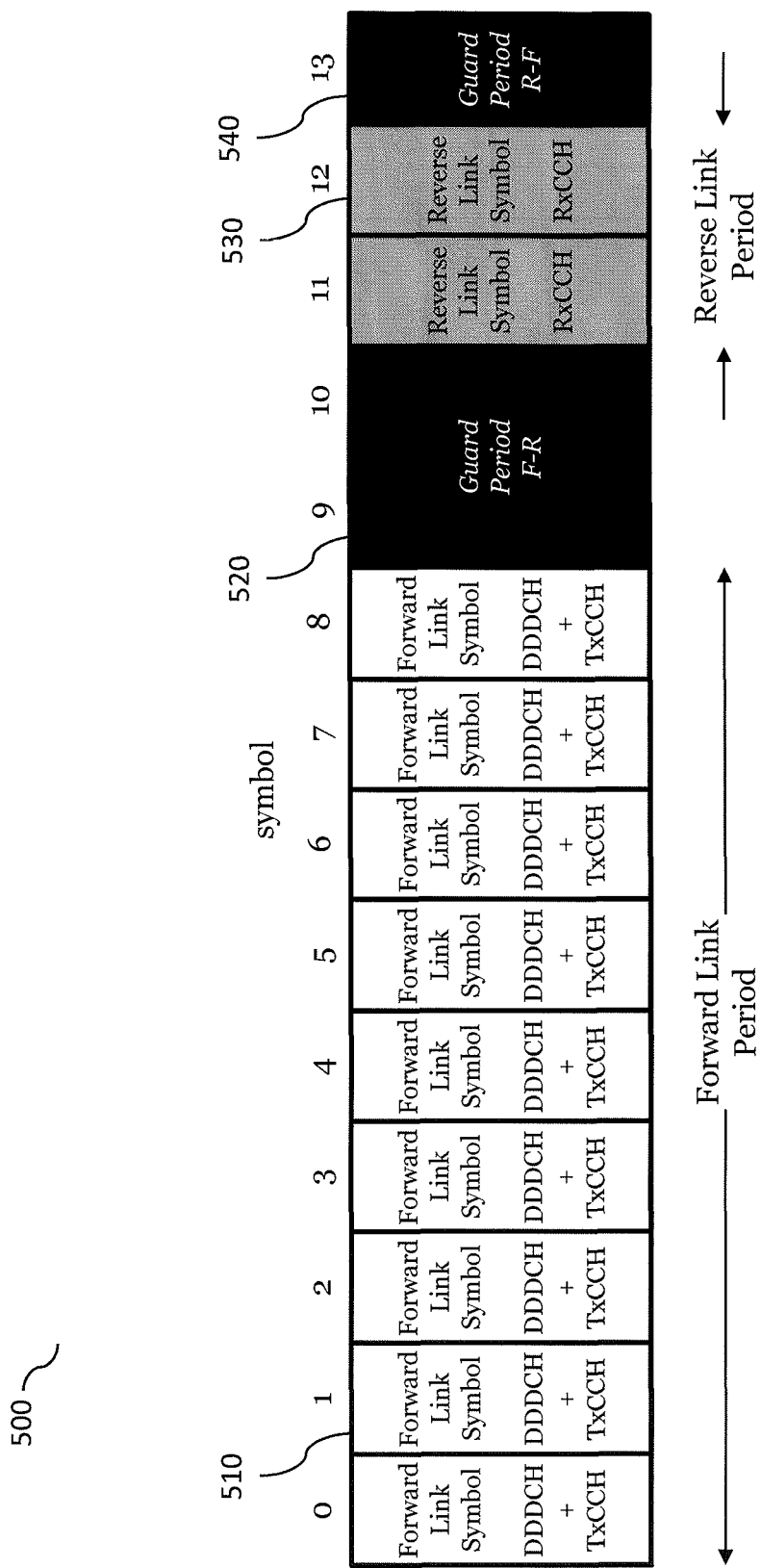
FIG. 5 is a diagram of a special subframe (SSF) structure.

FIG. 5 is a diagram of a special subframe (SSF) 500. SSF 500 may comprise zero, one or more forward link symbols 510, zero or one forward-to-reverse guard periods 520, one or more reverse link symbols 530, and zero or one reverse-to-forward guard periods 540. A group of forward link symbols 510 may be referred to as a forward link period and a group of reverse link symbols 530 may be referred to as a reverse link period.

In the SSF 500, a forward-to-reverse guard period 520 may be allocated to allow for a transition from transmit-to-receive mode at the transmitter and from receive-to-transmit mode at the receiver. Once the receiver has transmitted its feedback, a reverse-to-forward guard period 540 may be allocated to allow for a transition from receive-to-transmit mode at the transmitter and from transmit-to-receive mode at the receiver. Guard periods 520 and 540 may be selected to accommodate the worst-case hardware switching time of a wireless device $T_{switch}$ plus the worst-case propagation delay between communicating devices $T_{prop}$; in some embodiments, a training period $T_{sync}$ may also be provided to allow the receiving device to synchronise with the transmitting device.

The number of OFDM symbols allocated as a forward-to-reverse guard period for a transition from the forward to reverse link ($n_{FRGP}^{sym}$) may be different from the number of symbols allocated for a reverse-to-forward guard period for a transition from the reverse to the forward link ($n_{RFGP}^{sym}$). This may be due, for example, to a need for a longer training period ($T_{sync}$) on a transition from the forward to reverse link than from the reverse to the forward link.

In some embodiments, the number of OFDM symbols required for transmission of feedback information on the reverse link by the Receiver ($n_{RL}^{sym}$) is-made-known-to both the transmitter and receiver and may be based on the volume of information to be transmitted, and the modulation and coding scheme to be used, by the receiver. The remaining OFDM symbols in the SSF may be available for transmission of forward link information by the Transmitter—i.e. $n_{FL}^{sym}=n_{SF}^{sym}-(n_{RL}^{sym}+n_{FRGP}^{sym}+n_{RFGP}^{sym})$ where $n_{SF}^{sym}$ is the number of symbols in the subframe, in some embodiments 14 for normal cyclic prefix, 12 if extended cyclic prefix is required to overcome inter-device timing errors.

In some embodiments, a Reverse Link Format Indicator (RLFI) may be encoded in every reverse link period. The RLFI may identify the Receiver Control Information contained in this instance of the reverse link and, by implication, the structure of the reverse link and the number of symbols ($n_{RL}^{sym}$) allocated to the reverse link period in this SSF. The location of the RLFI is-made-known-to both the Transmitter and the Receivers; it may, for example, be encoded across a set of resource elements in a SSF that encompass one or more symbols of the SSF and one or more subcarriers of the SSF.

FIG. 5 shows an example of a subframe with normal cyclic prefix where $n_{FRGP}^{sym}=2$, $n_{RFGP}^{sym}=1$, and $n_{RL}^{sym}=2$. In this embodiment, the reverse link period and its surrounding guard periods may be located at the end of the special subframe; in other embodiments, the reverse link period and its surrounding guard periods may be located at the beginning or in the middle of the special subframe.

In some embodiments, the location and size of the reverse link period within a SSF is-made-known-to both the transmitter and receiver; in other embodiments, the FLFI may indicate the first symbol within the SSF assigned to the reverse link period. In some embodiments, the RLFI may indicate the number of symbols encompassed by the reverse link period within the current SSF; in these embodiments, the reverse link period (plus the following reverse-to-forward link guard period) may be extended to the end of the current subframe, if necessary, to provide the required receiver control information.

Consecutive virtual subframes of a DD2D link may not be physically contiguous in the allocated spectrum. Consecutive virtual subframes may be separated in time and/or frequency by physical radio resources allocated by the base station to other devices. In addition, one virtual frame of a DD2D link may be mapped across multiple physical frames. Virtual subframes may be designed to work with any allocation of physical radio resources provided by the base station. In some embodiments, no constraints may be placed on the scheduler in the base station regarding the allocation of physical radio resources to the IDS, i.e. the scheduler is free to assign radio resources for use as a D2D link according to its own, internal procedures. Radio resource allocations may, for example, be periodic or aperiodic and may be assigned for a single physical subframe or for a series of contiguous physical subframes.

Figure 6:
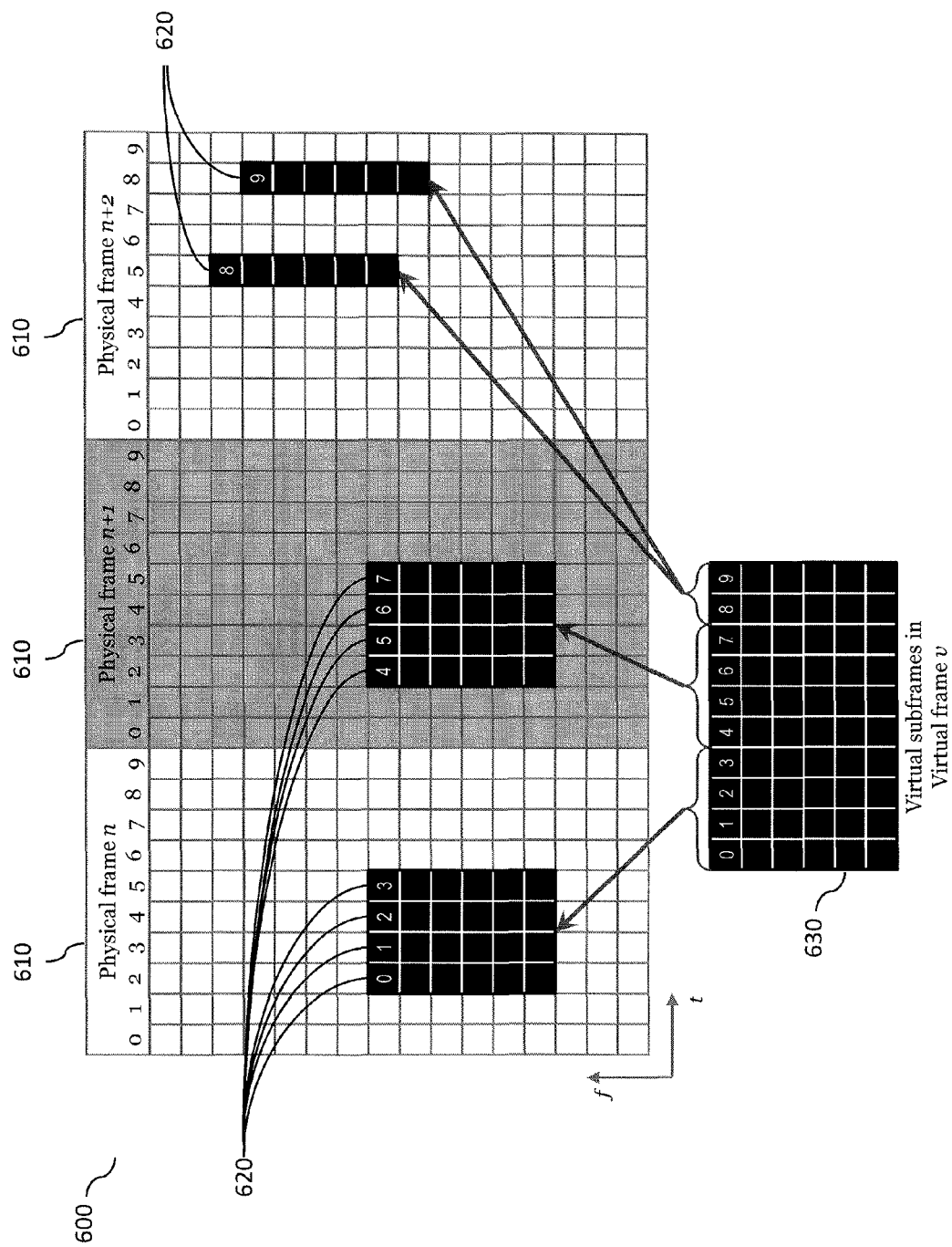
FIG. 6 is a diagram of a virtual subframe mapping.

FIG. 6 is a diagram of virtual subframe mapping 600. Virtual subframe mapping 600 comprises three physical frames 610; ten virtual subframes 620; and a virtual frame 630. While three physical subframes 610 are shown, any number of physical subframes 610 may be used to transmit the virtual subframes 620 of the virtual frame 630. Further it should be understood that the location of the virtual subframes 620 within the physical subframes 610 may vary based upon the needs of the base station and/or the IDS. For example, as shown in FIG. 6, virtual subframe number (VSFN) 0-3 of virtual frame v are mapped to physical subframe number (PSFN) 2-5 of physical frame n, VSFN 4-7 to PSFN 2-5 of physical frame n+1, and VSFN 8-9 to PSFN 5 and 8 of physical frame n+2. In this example, the DD2D allocations in physical frames n and n+1 may be the result of an IDS semi-persistent schedule (SPS) while the allocations in physical frame n+2 may be the result of dynamic per-subframe IDS scheduling by the base station.

In some embodiments, there may be a timing relationship between a forward link subframe and a reverse link subframe. These timing relationships may be based on virtual time (e.g. expressed in terms of virtual subframe numbers) or they may be based on real time (e.g. expressed in terms of physical subframe numbers).

In one embodiment, DD2D operations and timing relationships may be expressed in terms of a virtual sub-frame number. For example, if a transmitter expects a response from a receiver in a reverse link allocation at a subframe j+m, where j is the current VSFN, then the response will be provided in the physical subframe corresponding to VSFN j+m In this embodiment, there may be no compensation for physical subframes that may be interposed between consecutive virtual subframes (e.g. between VSFN 3 and VSFN 4 in FIG. 6).

In other embodiments, DD2D operations and timing relationships may be expressed in terms of physical subframe timing with respect to the current (virtual) subframe. For example, if a transmitter expects a response from a receiver in a reverse link allocation at a subframe j+$\Delta$t, where j is the current VSFN, then the response will be provided in the first physical subframe allocated to the IDS occurring after $\Delta$t. In some cases, the transmitter and receiver may not be able to immediately predict the VSFN of this subframe since it may be dependent on future resource assignments made by the base station.

Figure 7:
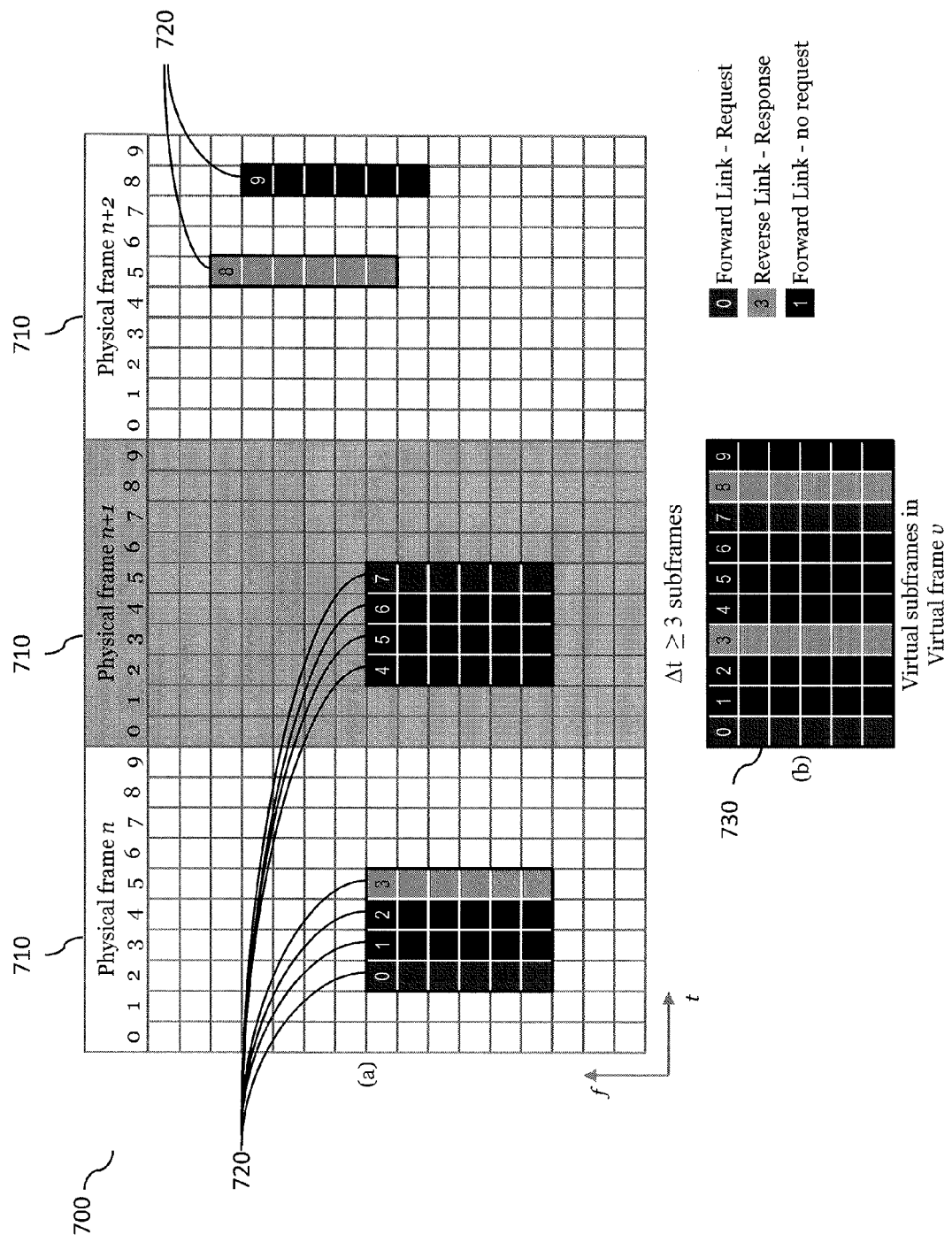
FIG. 7 is a diagram of a virtual to real time mapping.

FIG. 7 is a diagram of virtual-to-real time frame mapping 700. Virtual-to-real time frame mapping 700 comprises three physical frames 710, ten virtual subframes 720 and one virtual frame 730. While three physical subframes 710 are depicted, it should be understood that any number of physical subframes 710 may be used in transmitting the virtual subframes 720 of the virtual frame 730. Further, the location of the virtual subframes 720 within the physical frames 710 may vary based on the needs of the base station and/or the IDS. The virtual subframes 720 may be forward link frames or reverse link frames (i.e. SSF). The forward link frames may or may not contain a receiver request.

The following example is provided in light of FIG. 7, the actual timing and location of the various subframes may vary depending on the base station and/or IDS. At VSFN 0, the transmitter may send an indication on the forward link to request feedback from the receiver. In this example, the response from the receiver may be scheduled—either implicitly or explicitly—in a special subframe (SSF) that cannot occur in less than three physical subframes (i.e. At 3 physical subframes). VSFN 0 may be mapped onto PSFN 2 of frame n, therefore for example, the SSF cannot be scheduled before PSFN 2+3=5 of frame n. Since PSFN 5 is already mapped to VSFN 3, the transmitter and receiver may both determine that VSFN 3 will be a SSF, allowing the receiver to respond to the request from the transmitter. At VSFN 7, the transmitter may send an indication on the forward link to request additional feedback from the Receiver. VSFN 7 is mapped onto PSFN 5 of frame n+1, therefore the SSF cannot be scheduled before PSFN 5+3=8 of frame n+1. Since there is no allocation to the IDS in PSFN 8, the transmitter and receiver both wait for another allocation from the base station before scheduling a SSF. In frame n+2, the base station allocates PSFN 5 to the IDS. The real time difference between the allocated PSFN 5 of frame n+2 and the request in PFSN 5 of frame n+1 meets the minimum timing criteria of $\Delta$t$\geq$3, therefore the transmitter and receiver both determine that VSFN 8 will be a SSF, allowing the receiver to respond to the request from the transmitter. It should be noted that the interval between request and response in the virtual subframe timing may or may not be constant based upon the configuration of the IDS, as shown in virtual frame 730. The virtual-to-real time mapping described in with relation to FIG. 7 may be used in any embodiment as required by the base station and/or the IDS. The value of m (3 in this example) may be different for each receiver in a PTM environment. Unless otherwise noted, the notation j+m implies j+$m^R$, where $m^R$ is the value of m for receiver R. In order to simplify the figures and examples provided herein, virtual frame structures may be depicted from the perspective of a single receiver, however the procedures may be used in a PTM environment with multiple receivers.

Control channel information exchanged over a DD2D link may mirror the control channel information exchanged over a D2BS link. On a D2BS link, control information may be designated as either Downlink Control Information (DCI) or as Uplink Control Information (UCI); in addition, the base station may use DCI to control uplink transmissions from a wireless device. In some of the embodiments described herein, control information on a D2D link may be designated as either Transmitter Control Information (TxCI), transmitted on the forward link from a transmitter to a receiver, or as Receiver Control Information (RxCI), transmitted on the reverse link from a receiver to a transmitter, according the role of the wireless device where the information originates.

Transmitter Control Information (TxCI) elements may be classified according to one of the following categories: Per-transmission information which may be communicated to the receivers along with every transport block transmission in a forward link subframe; semi-persistent information which may be communicated to the receivers only before the first user plane transmission and thereafter only when there is a need to change the information previously communicated; and event notification information which may be communicated to the receivers whenever a triggering event is detected. While three categories are described herein, other categories may be used as necessary. TxCI elements may be mapped to a transmitter control channel (TxCCH).

TxCCH per-transmission information may be robustly encoded to maximise the probability of successful first-time reception since there may be no opportunity to retransmit this information and ongoing communication may be dependent upon this information being successfully received. Therefore, in some embodiments, this information may be transmitted in a dedicated side channel. Per-transmission information may include the following: HARQ process number (PN); HARQ data sequence number (SN); HARQ redundancy version (RV); and, in some embodiments, modulation and coding scheme (MCS). In addition, the transmitter may also transmit a reference signal (TRS) as part of the FLSF transmission.

A change in TxCI semi-persistent information may only take effect once a receiver has acknowledged successful receipt of the updated information. If a transmitter does not receive a successful acknowledgement to an announcement indicating a change in semi-persistent information, the transmitter may retransmit the announcement. TxCCH semi-persistent information may include the following: MIMO precoding matrix indication (TPMI); rank indicator (RI); number of transmitter antenna ports; and, in some embodiments: modulation and coding scheme (MCS).

TxCI Event notifications may be transmitted as required. However, ongoing communication may be dependent upon this information being successfully received, therefore a receiver may be required to acknowledge—either implicitly or explicitly—successful receipt of an event notification. If a transmitter does not receive a successful acknowledgement of an event notification, the transmitter may retransmit the notification. TxCCH event notification information may include the following: Receiver reference signal request indication; HARQ feedback request indication; channel state information (CSI) feedback request indication; and channel release indication.

Each Receiver Control Information (RxCI) element may be classified according to one of the following categories: Per-transmission information which must be communicated to the transmitter in response to a transport block transmission; periodic information which must be communicated to the transmitter on a regular basis; and event notification information which must be communicated to the transmitter whenever a triggering event is detected. While three categories are described herein, other categories may be used as necessary. RxCI elements may be mapped to a receiver control channel (RxCCH).

Per-transmission RxCI information may be robustly encoded to maximise the probability of successful first-time reception since there may be no opportunity to retransmit this information and ongoing communication may be dependent upon this information being successfully received. RxCCH per-transmission information may include HARQ ACK/NAK.

Periodic RxCI information may be sent at prescribed intervals either continually or for a specified period of time. Periodic information transmitted by a receiver may not be acknowledged by the transmitter—if a transmitter does not successfully receive a periodic report, it may simply wait for the next report or interpolate from previous reports. If a transmitter fails to successfully receive reports for an extended period of time, it may trigger a transmitter event notification to the receiver (e.g. radio link failure). RxCCH periodic information may include the following: buffer status report (BSR); channel quality indication (CQI); and precoding matrix indication (PMI). The receiver may also periodically transmit a receiver reference signal (RRS) either as part of the periodic RxCCH transmission or as a separate transmission.

RxCI Event notifications may be transmitted only as required. However, ongoing communication may be dependent upon this information being successfully received, therefore a transmitter may be required to acknowledge successful receipt of an event notification. If a receiver does not receive a successful acknowledgement of an event notification, the receiver may retransmit the notification. RxCCH event notification information may include the following: radio link failure (RLF) imminent; channel access request; and channel release acknowledgement.

In some embodiments, a Direct Device-to-Device Control Channel (DDCCH) may be allocated to each role within the inter-device session—a Transmitter Control Channel (TxCCH) may be assigned to each device that is able to assume a transmitter role within an IDS and a Receiver Control Channel (RxCCH) may be assigned to each device that is able to assume a receiver role within an IDS. Note that a given device may be contemporaneously engaged in multiple inter-device sessions and may assume different roles within each of those sessions; a device may be assigned a different DDCCH for each session in which it participates.

In some embodiments, a TxCCH may comprise one or more dedicated side-band channels and/or a PDU-interleaved in-band channel. Per-transmission information may be carried in a side-band channel dubbed TxCCH-S. Semi-persistent information and event notifications may be carried in an in-band channel, dubbed TxCCH-I, using control plane PDUs that are interleaved with user plane PDUs. In other embodiments, semi-persistent information and/or event notifications may be carried in a side-band channel where the presence of one or more of the side-band channels may be indicated by the Forward Link Format Indicator (FLFI).

Per-transmission information may be robustly communicated to the receivers to ensure that the transmission may be properly decoded. In some embodiments, such information may be carried in a side-band channel using a reliable modulation and coding scheme (MCS) that is known a priori by the receivers (i.e. MCS of the TxCCH-S is not blindly determined). The location of the TxCCH-S is-made-known-to both the transmitter and the receivers; it may, for example, be encoded across a set of resource elements in a FLSF that encompass one or more symbols of the FLSF and one or more subcarriers of the FLSF. In other embodiments, the structure and encoding of TxCCH-S may be defined by the Forward Link Format Indicator. The TxCCH-S control information elements for each transport block (TB) may include: HARQ process number; HARQ sequence number; HARQ redundancy version; HARQ feedback request indication; and, in some embodiments: modulation and coding scheme.

The TxCCH-I in-band channel may be similar to LTE MAC PDU structure comprising a MAC header, zero or more MAC service data units (SDUs), zero or more MAC control elements, optional padding, and zero or more TxCCH-I control elements. The MAC header, the MAC and TxCCH-I control elements, and the MAC SDUs may all be of variable sizes. A MAC PDU header may comprise one or more MAC PDU sub-headers and zero or more TxCCH-I sub-headers; each sub-header may correspond to either a MAC SDU, a MAC control element, a TxCCH-I control element, or padding. In a variant of this embodiment, there may be only zero or one TxCCH-I control element in a MAC PDU; if present, the TxCCH-I control element may comprise one or more TxCI elements. The TxCCH-I control information elements may include: RRS transmission request; channel release indication; CSI feedback request indication; and, in some embodiments: modulation and coding scheme. TxCCH-I is an in-band channel, and may be encoded with the MCS currently selected for user information and HARQ may be used for error control.

In some embodiments, a single channel may be defined for the carriage of all receiver control information on the reverse link. In other embodiments, multiple channels may be defined for the carriage of receiver control information; in these instances, a channel may be designed to specifically communicate one type of information or a specific combination of information. Reference signals may be provided in a set of resource elements that are distributed throughout the RxCCH.

In some embodiments, all of the feedback from the Receiver may be transmitted in each allocated reverse link period. In these single RxCCH embodiments, the RxCCH control information elements may include: HARQ ACK/NAK; channel quality indication; precoding matrix indication; buffer status; imminent radio link failure indication; channel access request indication; or channel release acknowledgement indication.

In some embodiments, a RxCCH may comprise a set of time-multiplexed, frequency-multiplexed, and/or code-multiplexed dedicated side-band channels. Per-transmission information and some time-critical event notifications may be carried in a one or more side-band channels dubbed RxCCH-T. Periodic information and other event notifications may be carried in one or more side-band channels dubbed RxCCH-I. The pattern of reverse link periods may be different for each of the various side-band channels. For example, the scheduling of a reverse link period for conveying per-transmission information may be tied to the number of HARQ processes while a reverse link period for conveying CSI information may be scheduled at more extended, periodic intervals.

Per-transmission information must be robustly communicated to the transmitter to ensure that the transmission may be properly progressed. In some embodiments, such information may be carried in a side-band channel using a reliable modulation and coding scheme (MCS) that is known a priori by the transmitter (i.e. MCS of the RxCCH-T is not blindly determined). The RxCCH-T information may include: HARQ ACK/NAK; imminent radio link failure indication; and/or channel release acknowledgement indication.

Periodic information may be robustly communicated to the transmitter to ensure that the transmission may be properly progressed. In some embodiments, such information may be carried in a side-band channel using a reliable modulation and coding scheme (MCS) that is known a priori by the transmitter; in some cases, the MCS used for RxCCH-I may be different from the MCS used for RxCCH-T. RxCCH-T information may include: channel quality indication; precoding matrix indication; buffer status report; and/or channel access request indication.

For some TxCI elements, two encodings may be identified—one for use in a PTM IDS and one that has been optimised for use in a PTP IDS. The TxCI elements described below are exemplary and that other encodings, conveying the same information, may be possible.

The channel release indication information element may be used to indicate that the role of transmitter is being passed to the designated device within the IDS following successful acknowledgement of the current transmission. The designated device may be expected to respond with a Channel Release Acknowledgement if it accepts the role of transmitter. In PTP sessions, the channel release indication information element may be assigned a value of 1 to indicate that the transmitter role is being passed to the current receiver. In PTP sessions, the channel release indication information element may be assigned a value of 0 to indicate that the current transmitter is retaining its role. In PTM sessions, the value of this element may correspond to the Session Device Identifier assigned to the designated Device within the IDS. The selection of a new transmitter may be based on the Channel Access Request Indications received by the transmitter and the relative priority assigned to the requesting device by the transmitter. In PTM sessions, the channel release indication information element may be assigned a value of 0 to indication that the current transmitter is retaining its role.

The CSI feedback request indicator information element may be used by the transmitter to explicitly request channel state information (CSI) from the designated Receiver; CSI feedback (e.g. CQI, PMI) may be expected in the reverse link period of subframe $j+M_{CSI}$, where j is the current VSFN and $M_{CSI}$ is-made-known-to both transmitter and receiver. In one embodiment, feedback from a receiver may be always explicitly requested by the transmitter using this information element. In other embodiments, a receiver may be scheduled to report CSI feedback at periodic intervals and this information element may be used by a transmitter to request feedback from the receiver before the next scheduled report. In PTP sessions, CSI feedback request indicator information element may be assigned a value of 1, which indicates that the transmitter is requesting feedback. In PTP sessions, CSI feedback request indicator information element may be assigned a value of 0, which indicates that no feedback is requested. In PTM sessions, CSI feedback request indicator information element may be assigned the value of the Session Device Identifier assigned to the designated device within the IDS. In PTM sessions, CSI feedback request indicator information element may be assigned a value of 'all', which indicates that all receivers should report. In PTM sessions, CSI feedback request indicator information element may be assigned a value of 0 which indicates that no feedback is requested. In other embodiments, the CSI feedback request indicator information element may be a bit vector. The transmitter may request CSI feedback from the receiver with Session Device Identifier R by setting bit R in the bit vector to a value of 1; setting bit R to a value of 0 indicates that no feedback is requested from that receiver.

The HARQ feedback request indication information element may be used by the transmitter to explicitly request HARQ ACK/NAK feedback from the designated receiver; feedback will be expected in the reverse link period of subframe $j+M_{HARQ}$, where j is the current VSFN and $M_{HARQ}$ is-made-known-to both Transmitter and Receiver. In some embodiments, feedback from a Receiver may be always explicitly requested by the transmitter using this information element. In some other embodiments, a receiver may be scheduled to report HARQ feedback at periodic intervals and this information element may be used by a transmitter to request feedback from the receiver before the next scheduled report. In PTP sessions, the HARQ feedback request indication information element may be set to 1, indicating that the transmitter is requesting feedback. In PTP sessions, the HARQ feedback request indication information element may be set to 0, indicating that no feedback is requested. In PTM sessions, HARQ feedback request indication information element may be assigned a value of the Session Device Identifier assigned to the designated device within the IDS. In PTM sessions, HARQ feedback request indication information element may be assigned a value of 'all', which indicates that all receivers should report. In PTM sessions, HARQ feedback request indication information element may be assigned a value of 0 which indicates that no feedback is requested. In other embodiments, the HARQ feedback request indicator information element may be a bit vector. The transmitter may request HARQ feedback from the receiver with Session Device Identifier R by setting bit R in the bit vector to a value of 1; setting bit R to a value of 0 indicates that no feedback is requested from that receiver.

The HARQ process number information element may identify the HARQ process associated with the transmitted transport block. The value of HARQ process number information element may be set to a value of 0 through ($N_{HARQ}-1$), where $N_{HARQ}$ is the configured number of HARQ processes. In LTE, $N_{HARQ}$ on the downlink may range from 4 (for TDD configuration 0) to 15 (for TDD configuration 5).

The HARQ data sequence number (SN) information element may be used to protect against loss, due to transmission errors, of a transport block or its acknowledgement. In each HARQ process, the SN may be initially set to '0' and may then be toggled on the initial transmission of a new transport block. HARQ retransmissions of a transport block may be sent using the sequence number contained in the first transmission of that transport block.

The HARQ redundancy version (RV) information element identifies the set of systematic and parity bits transmitted by a HARQ process from the rate matching circular buffer of a channel-coded transport block. The HARQ RV information element may be set to a value of 0 through ($N_{RV}-1$), where $N_{RV}$ is the number of pre-defined redundancy versions in a circular buffer.

The modulation and coding scheme (MCS) information element may define the modulation and coding scheme to be used on subsequent transmissions from this transmitter, beginning with the next HARQ transmission following acknowledgement of this change. The specified MCS may remain in effect either until it is changed again by the current transmitter or until the transmitter relinquishes its role to another device. The MCS information element may be set to a value of 0 through ($N_{MCS}-1$), where $N_{MCS}$ is the number of pre-defined modulation and coding schemes.

The receiver reference signal request information element may be used to indicate that the designated receiver should begin transmission of its reference signal for a pre-defined period of time. In PTP sessions, the receiver reference signal request information element may be set to a value of 1, indicating that the receiver should begin RRS transmission. In PTP sessions, the receiver reference signal request information element may be set to a value of 0, indicating that no RRS transmission is required. In PTM sessions, the RRS request information element may be set to a value of the Session Device Identifier assigned to the designated device within the IDS. In PTM sessions, the RRS request information element may be set to a value of 'all', which indicates that all receivers should report. In PTM sessions, the RRS request information element may be set to a value of 0, which indicates that no RRS transmission is required. In other embodiments, the receiver reference signal request indicator information element may be a bit vector. The transmitter may request transmission of a receiver reference signal from the receiver with Session Device Identifier R by setting bit R in the bit vector to a value of 1; setting bit R to a value of 0 indicates that no receiver reference signal is requested from that receiver.

Unlike TxCI element encodings, only one form of RxCI element encoding may be required since all reverse link transmissions may be point-to-point, e.g., from one receiver to its associated transmitter.

The buffer status report information element reflects the volume of data currently enqueued at the receiver for transmission to other devices in the IDS. The buffer status report information element may be set to a value of 0 through ($N_{BSR}-1$), where $N_{BSR}$ is the number of pre-defined quantisation levels, which indicates the quantised volume of data currently enqueued.

The channel access request indication information element may be used by a receiver to indicate that it wants to assume the transmitter role in an IDS due, for example, to the enqueuing of user information destined for other devices in the IDS. This is comparable to the signalling of a Scheduling Request in LTE PUCCH. If the receiver is selected as the new transmitter in the next Channel Release Indication, then the Channel Access Request is deemed to have been successfully acknowledged. Otherwise (i.e. another device is selected in the next Channel Release Indication or there is a channel release timeout), the Channel Access Request is deemed to have failed and the device must re-issue the request to the (new) current transmitter (i.e. the one designated by the latest Channel Release Indication). The channel access request indication information element may be set to a value of 1, which indicates that the receiver is requesting to change its role to transmitter. The channel access request indication information element may be set to a value of 0, which indicates that the receiver is retaining its current role.

The channel release acknowledgement indication information element may be used by a receiver to indicate that it has accepted the transmitter role in an IDS following a previous Channel Access Request Indication. A receiver may choose to not accept the transmitter role in an IDS if, for example, it conflicts with the device's role in another IDS. The channel release acknowledgement indication information element may be set to a value of 1, which indicates that the Receiver is accepting the role of Transmitter. The channel release acknowledgement indication information element may be set to a value of 0, which indicates that the Receiver is retaining its current role (rejecting the role of transmitter).

The channel quality indication information element may reflect the highest MCS that can be decoded by the receiver while maintaining an acceptable transport block error rate. The channel quality indication information element may be set to a value of 0 through 15, which indicates the CQI index.

The HARQ ACK/NAK information element may be used to indicate multiplexed ACK/NAK responses. To conserve reverse link radio resources and to maximise forward link throughput, HARQ ACK/NAK for up to $N_{ACK}$ transport blocks may be aggregated and communicated to the transmitter in one transmission over RxCCH. The value of $N_{ACK}$ is made-known-to both the transmitter and receiver such that $N_{ACK} \leq N_{HARQ}$ where $N_{HARQ}$ is the number of configured HARQ processes. The transmitter may request acknowledgement from a receiver after the (re-) transmission of k ($k \leq N_{ACK}$) transport blocks. The reception status (ACK/NAK) for each HARQ process may be returned in a bit vector of $N_{HARQ}$ bits, harqstatus[0: $N_{HARQ}-1$], where bit i corresponds to the ACK/NAK status of HARQ process i. If $k < N_{HARQ}$ then the bits for the HARQ processes not included in the status may be set to zero ("NAK"). The HARQ ACK/NAK information element may be set to a value of harqstatus[i]=0, indicating NAK. The HARQ ACK/NAK information element may be set to a value of harqstatus[i]=1, indicating ACK.

The imminent radio link failure indication information element may be used by a receiver to indicate that the received signal quality has deteriorated to the point where continued communication via the DD2D link may not be possible. The transmitter may then take measures to counteract the degraded signal (e.g. change MCS, increase transmit power) or it may terminate the inter-device session. The imminent radio link failure indication information element may be set to a value of 1, which indicates that DD2D link failure is imminent. The imminent radio link failure indication information element may be set to a value of 0, which indicates that signal quality is acceptable.

The transmit power control information element may provide an indication to the transmitter of recommended changes to its current transmit power level using accumulative TPC commands. The transmit power control information element may be set to a value of 0 through 3, which indicates the value of $\delta_{FL}$ (equivalent to LTE $\delta_{PUSCH}$) to be applied by the transmitter.

The precoding matrix indicator information element (PMI) identifies the MIMO precoding to be used by the transmitter based on channel state estimations performed by the receiver. The PMI information element may be set to a value of 0 through 7, which indicates the PMI for a transmitter with two antenna ports. The PMI information element may be set to a value of 0 through 63, which indicates the PMI for a transmitter with four antenna ports.

Reference signals may be interspersed with the transmission of other control information on both the forward and reverse links. The transmitter reference signal (TRS) may be provided for channel estimation to allow the receiver to perform coherent demodulation. In some embodiments, TRS is transmitted in forward link subframes according to a pattern that is-made-known-to both Transmitter and Receiver.

In some embodiments, the receiver reference signal (RRS) may be used by the transmitter to compensate for misalignment in subframe timing between the transmitter and receiver. In contrast to an LTE wideband sounding reference signal (SRS), RRS may not be intended for use in determining the best sub-band based on frequency-selective fading because resources for the D2D link are assigned by the base station, possibly using input from a wideband uplink SRS transmission. In some embodiments, RRS may be transmitted in reverse link periods according to a SSF pattern that is-made-known-to both Transmitter and Receiver. In other embodiments, RRS may be transmitted in the reverse link period of every SSF. In further embodiments, transmission of RRS may be explicitly requested by the transmitter.

DD2D data transmission and acknowledgement may include the following steps: 1) (Initial) selection of the modulation and coding scheme (MCS); 2) Transmission of user plane data in one or more forward link subframes by the Transmitter; and 3) HARQ ACK/NAK feedback transmitted in the reverse link allocation of a special subframe by the Receiver.

When a wireless device initially assumes the transmitter role in an IDS, it may or may not have channel state information on which to base selection of the MCS. The transmitter may base its selection of MCS for the initial (set of) transmissions on one or more of the following: information provided by the base station (e.g. using IDS CQI feedback provided by the Devices); a conservative MCS scheme provided by MCS table; a rate probing algorithm (e.g. a search over the allowed MCS space) that seeks to minimise the number of HARQ NAKs received by the transmitter; channel estimates derived from proximity detection signals or from the monitoring of other reference signals (e.g. SRS, DMRS); channel estimates derived when the device was in a receiver role, assuming channel reciprocity; and/or the MCS used by the previous transmitter.

In some embodiments, if the transmitter decides to select a different MCS, an MCS TxCI may be transmitted as semi-persistent information in the in-band TxCCH-I of a forward link subframe; this TxCI, and any accompanying user plane PDU, may be transmitted using the default MCS. Thereafter, if the transmitter elects to change the MCS, an MCS TxCI may be transmitted in the in-band TxCCH-I using the MCS in force for that transport block (i.e. using the MCS contained in the last received MCS TxCI).

Figure 8:
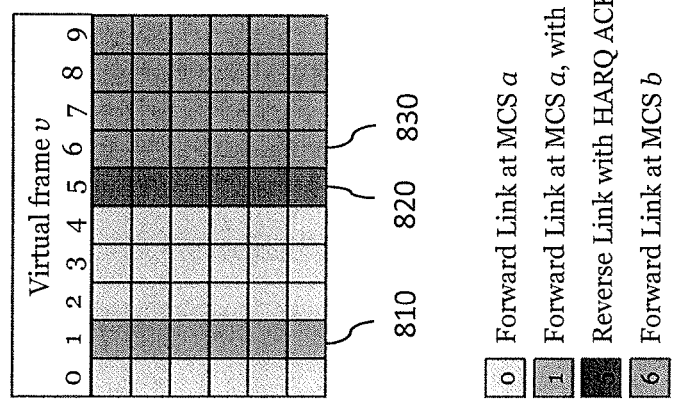
FIG. 8 is a diagram of a signaled change in MCS.

The new value of MCS takes effect with the transmission of the next transport block following successful HARQ acknowledgement of the transport block containing the MCS TxCI. FIG. 8 is a diagram of a signalled change in MCS 800. At subframe 1 810 the transmitter indicates a desire to change from MCS a to MCS b. At subframe 5 820, the transmitter receives an SSF with an ACK for the change. At subframe 6 830, the transmitted begins using MCS b.

Since HARQ ACK/NAK transmissions may not be guaranteed to be successfully received by the transmitter, there is a possibility that the transmitter and receiver will not agree on the MCS expected in a FLSF. For example, if a HARQ NAK is interpreted as an ACK by the transmitter, then the transmitter may begin using the new MCS while the receiver is expecting the old MCS. Similarly, if a HARQ ACK is interpreted as a NAK by the transmitter, then the transmitter may continue using the old MCS while the receiver is expecting the new MCS. Since the receiver may be unable to decode subsequent transmissions, it may report a succession of NAKs to the transport blocks transmitted in subsequent FLSFs. Therefore, the transmitter may assume that its current choice of MCS is a bad one and may react to these NAKs by signalling a change to another (more robust) MCS.

In other embodiments, an MCS TxCI may be transmitted as per-transmission information in the side-band TxCCH-S of every forward link subframe. If the Transmitter selects a different MCS that causes the Receiver to report a succession of NAKs, the Transmitter may assume that its current choice of MCS is a bad one and may react to these NAKs by signalling a change to another (more robust) MCS.

Each transmission in a forward link subframe may include the side-band Transmitter Control Channel (TxCCH-S), conveying per-transmission Transmitter Control Information (TxCI), along with a transport block containing a Direct Device-to-Device Data Channel (DDDCH) PDU, an in-band Transmitter Control Channel (TxCCH-I) PDU, or both.

Transport blocks in a FLSF may be transmitted using asynchronous, adaptive HARQ. Asynchronous HARQ may be selected when the amount of information to be sent by a transmitter is not known a priori. The transmitter may explicitly request HARQ feedback when, for example, its transmit buffer is empty or when all of its HARQ processes become engaged. Adaptive HARQ may be selected when a HARQ transmission or retransmission may be sent using the MCS in force for the subframe where the (re)transmission occurs. Rate matching may be used if there is a difference in MCS between an initial HARQ transmission and a retransmission.

Figure 9:
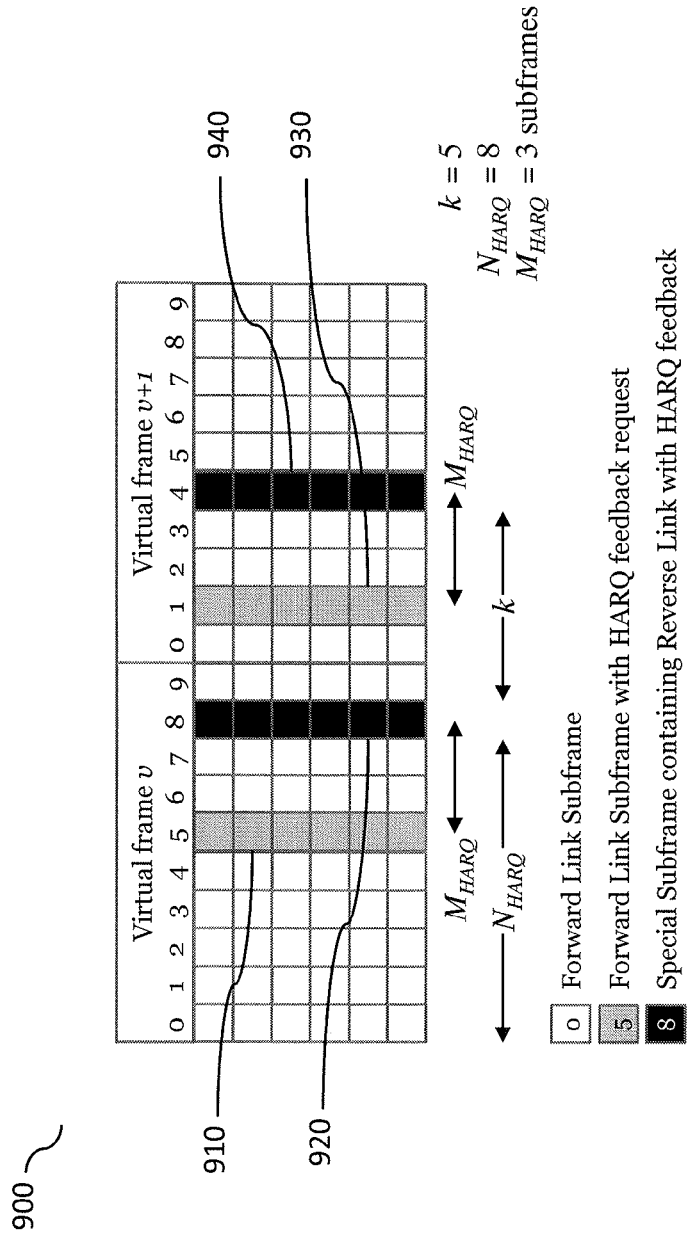
FIG. 9 is a diagram of a HARQ feedback request and response.

In some embodiments, when the transmitter requests HARQ feedback in subframe j, the HARQ response in a special subframe (SSF) from the receiver may not occur before subframe $j+M_{HARQ}$. In addition, the transmitter may transmit, at most, $N_{HARQ}$ transport blocks before receiving feedback from the receiver; the transmitter may, however, request feedback after the unacknowledged transmission of k ($k \leq N_{HARQ}$) transport blocks if, for example, its transmit buffer is empty or if, due to delays in the granting of radio resources by the base station, a more timely response is required from the receiver. FIG. 9 is a diagram of a HARQ feedback request and response 900. In FIG. 9, k=5, $N_{HARQ}$=8, and $M_{HARQ}$=3. A transmitter transmits a HARQ feedback request at virtual frame v subframe 5 910 and receives HARQ feedback at virtual frame v subframe 8 920. Subsequently, a transmitter transmits a HARQ feedback request at virtual frame v+1 subframe 1 930 and receives HARQ feedback at virtual frame v+1 subframe 4 940.

In the SSF scheduled for providing HARQ feedback, the receiver may transmit a HARQ status vector in the reverse link period. The HARQ status vector may indicate positive (ACK) or negative (NAK) acknowledgement from each HARQ process engaged in the reception of a transport block. A HARQ process at the transmitter that receives an ACK may transmit a new transport block after toggling the value of the HARQ data sequence number. A HARQ process at the transmitter that receives a NAK may retransmit the transport block using the sequence number contained in the first transmission of that transport block. The retransmission may use a different redundancy version of the transport block and may, in addition, use an MCS that is different from that used in the initial transmission.

In some embodiments, feedback from a receiver to a transmitter may be provided on-demand from the transmitter. In another embodiment, the transmitter may select the feedback category (e.g. HARQ, CQI, RRS) or the combination of feedback categories that it requires; in yet another embodiment, a feedback request from the transmitter may imply a request for all feedback categories.

In other embodiments, feedback may be provided by the receiver according to a special subframe (SSF) pattern that is-made-known-to both the transmitter and receiver. In another embodiment, the SSF pattern may be different for each feedback category (e.g. CQI, RRS) or for a combination of feedback categories; in another embodiment, the SSF pattern may imply the transmission of all feedback categories in each reverse link period. SSF patterns may not be used for HARQ feedback because HARQ is asynchronous and HARQ ACK/NAK feedback may always be provided on-demand.

Figure 10:
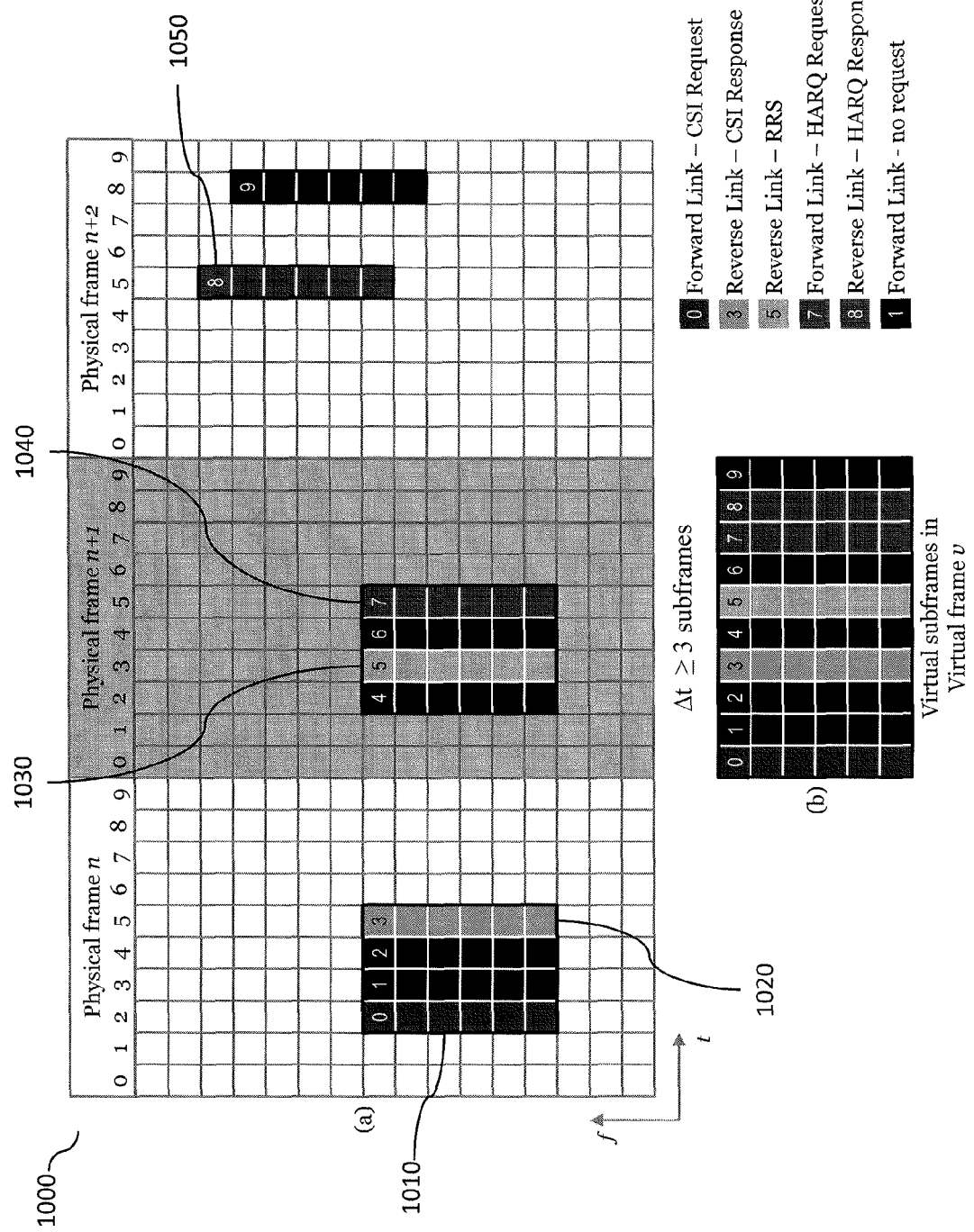
FIG. 10 is a diagram of a receiver feedback mix of patterns and on-demand feedback.

FIG. 10 is a diagram of a receiver feedback with a mix of patterns and on-demand feedback. In VSFN 0 1010, the transmitter signals a request for CSI feedback but does not signal a request for HARQ feedback. Based on a value of $M_{CSI}$=3 physical subframes that is-made-known-to the transmitter and receiver, VSFN 3 1020 is deemed to be a SSF and the receiver provides its CSI feedback in this subframe. The receiver has been configured to transmit, and the transmitter has been configured to receive, RRS feedback in VSFN 5

1030 of every virtual frame. Therefore VSFN 5 1030 is deemed to be a SSF by both the receiver and the transmitter, obviating the need for a specific request for RRS from the transmitter. In VSFN 7 1040, the transmitter signals a request for HARQ feedback. Based on a value of $M_{HARQ}=4$ physical subframes that is-made-known-to the transmitter and receiver, VSFN 8 1050 is deemed to be a SSF and the receiver provides its HARQ feedback in this subframe.

In some embodiments, the radio resource allocation for a DD2D link only allows a half-duplex mode of communications. In these scenarios, the role of transmitter is coordinated amongst the participants in the IDS through a three-way handshake.

Figure 11:
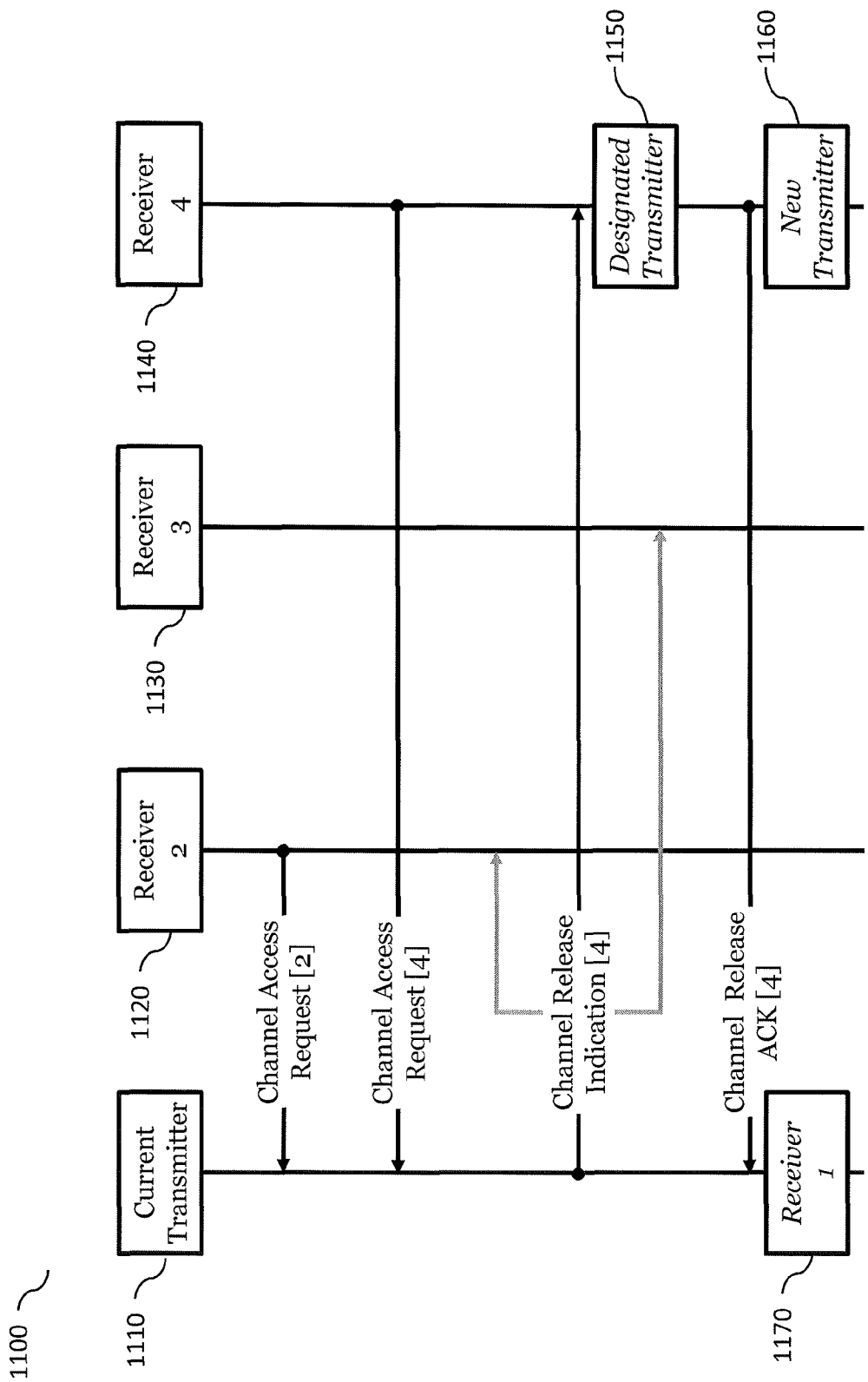
FIG. 11 is a diagram of a three way handshake.

FIG. 11 is a diagram of a three way handshake. Current transmitter 1110 may receive a channel access request from receiver 2 1120 and receiver 4 1140. Current transmitter 1110 may determine which receiver to designate as the new transmitter. Current transmitter 1110 determines that receiver 4 1140 should be the new transmitter and transmits a channel release indication in a forward link period to receiver 2 1120, receiver 3 1130, and receiver 4 1140 in their reverse link periods. Upon receiving the channel release indication receiver 4 1140 becomes designated transmitter 1150. Designated transmitter 1150 transmits a channel release ACK to current transmitter 1110 in its reverse link period. Subsequently current transmitter 1110 becomes receiver 1 1170, and designated transmitter 1150 becomes new transmitter 1160.

In summary, a receiver that has data for the IDS in its buffer and wants to assume the role of transmitter sends a Channel Access Request to the current transmitter during its assigned reverse link period. If the current transmitter accepts the request, it transmits a Channel Release Indication to the newly designated transmitter. This indication is transmitted on the forward link and is seen by all of the receivers in the IDS so that they become aware of which device is assuming the role of transmitter. The designated transmitter accepts the role of transmitter in the IDS by sending a Channel Release Acknowledgement to the current transmitter during its assigned reverse link period. At this point, the current transmitter assumes a receiver role within the IDS and the designated device assumes the transmitter role within the IDS, using the radio resources currently assigned to the DD2D link.

In a half-duplex mode of communications, a wireless device retains the role of transmitter until it explicitly relinquishes that role to another device. A wireless device may relinquish its role as the transmitter due to one of the following: exhaustion of data held in the device's transmit buffer; expiration of a timer limiting how long a device may remain in the Transmitter role; or reception of a Channel Access Request from a higher priority device.

Once the transmitter has elected to relinquish its role, it transmits a Channel Release Indication to the device designated by the transmitter to assume the role of transmitter. The designated device may, for example, be the highest priority device to have sent a Channel Access Request to the transmitter; priority may be based on one or more of the following: the volume of data enqueued at the receiver, as indicated in a Buffer Status Report; one or more characteristics of the requesting device or its user (e.g. a supervisor in a public safety scenario); an event notification raised by the requesting device (e.g. degrading signal quality); an application-specific event notification (e.g. an emergency situation); or the amount of time that the Channel Access Request has been pending. If the transmitter has received multiple Channel Access Requests within a given priority level, some additional criteria may be used to select the designated device (e.g. first come, first served). If the transmitter has not received any Channel Access Request but no longer needs to retain the role of transmitter (e.g. the device has no more data to transmit), then the transmitter may retain the role of transmitter in order to mediate channel access during a DD2D dormancy phase.

When a device selected as the designated transmitter receives a Channel Release Indication, the device (currently in a receiver role) may respond with a positive Channel Release Acknowledgement if it accepts the role of transmitter. If the Designated Transmitter chooses not to accept the role of Transmitter (e.g. if this would conflict with its role in another IDS), then it may respond with a negative Channel Release Acknowledgement. In this case, the role of transmitter does not change. If the current transmitter received other Channel Access Requests, it may restart its selection process and transmit a Channel Release Indication to its subsequent choice of designated transmitter. If there are no other (suitable) choices for the role of designated transmitter, the current transmitter may transmit a Channel Release Indication identifying itself as the "new" transmitter, effectively cancelling any previous channel release that was not accepted. The Channel Release Acknowledgement may be transmitted in the reverse link period of a SFS rather than in a FLSF (by the new transmitter) to accommodate the possibility that the designated device does not accept the offered role of transmitter.

In a point-to-multipoint mode of communications, multiple receivers may simultaneously vie for the role of transmitter by sending Channel Access Requests. If a contending receiver receives a Channel Release Indication where it is not identified as the designated transmitter, the Channel Access Request may be deemed to have failed and the receiver may re-issue its Channel Access Request to the new transmitter (i.e. the device designated by the Channel Release Indication).

"Dormant" may be defined as an IDS state where radio resources are currently allocated to the DD2D link by a base station but none of the Devices in the IDS has data available to send. In this case, the role of transmitter may remain with the last device to assume that role. While the IDS is in a dormant mode, the primary functions of the transmitter may be to mediate channel access and to monitor the signal quality of the DD2D link. If the transmitter itself is the first device to enqueue data for transmission to the receivers of the IDS, it may immediately proceed with normal data transmission procedures. If a receiver enqueues data for transmission to other devices in the IDS, the receiver may first attempt to acquire the role of transmitter. During dormant mode, the transmitter may continue to transmit forward link subframes with transmitter reference signals that may include control plane PDUs but may not include user plane PDUs. Receivers may continue to provide CSI feedback and/or receiver reference signals on a periodic basis to ensure the DD2D link is viable and to allow the transmitter to select an MCS for use when and if communications are restarted. The pattern of FLSFs containing transmitter control information and the pattern of SFSs containing receiver control information are-made-known-to the transmitter and the receivers in the IDS.

In some embodiments, the notification of an event may be provided at the earliest opportunity. In another embodiment, provision may be made in each subframe for the signalling of the applicable event. In yet another embodiment, signalling of the event may pre-empt the transmission of other scheduled information. In still other embodiments, the notification of an event may only be provided in subframes that are configured to provide that information according to a pattern of subframes that is-made-know-to both the transmitter and receivers.

Imminent radio link failure event notification is an indication to the transmitter that the D2D link is degrading quickly thus allowing the transmitter to take some remedial action (e.g. change MCS, increase transmit power, revert to a normal uplink/downlink session). This indication may be multiplexed with the per-transmission information (HARQ ACK/NAK) so that it may be (i) more timely than a (periodic) CSI report, and (ii) a more explicit indication of degrading signal than repeatedly sending HARQ NAKs.

If a receiver determines that it has lost the DD2D link to the transmitter, the device must assume that it is no longer a member of the IDS and must engage with the base station to re-establish communications with its peers. If a transmitter determines that it has lost the DD2D link to one of its receivers, the transmitter may elect to continue in its role as transmitter if the DD2D links to other receivers in the IDS are still viable. If a transmitter determines that it has lost the DD2D link to all of its receivers, the device may assume that it is no longer a member of the IDS and may engage with the base station to re-establish communications with its peers.

Physical radio resources in an LTE system may be allocated to the DD2D link by a base station using grants contained in the Downlink Control Information (DCI) of a Physical Downlink Control Channel (PDCCH). Transmissions on the PDCCH may be sent in an unacknowledged mode, meaning that the base station does not receive any explicit feedback on whether the devices targeted to receive a DCI actually received the grant without errors. It is therefore possible that either the transmitter, the receiver, or both may fail to receive a grant of radio resources. If only one of the Devices (either transmitter or receiver) receives a resource allocation from the base station, their independent calculation of special subframe (SSF) timing may result in a situation where the transmitter and receiver do not agree on which virtual subframe will contain the next SSF. In these situations, the opinion of the transmitter always takes precedence: the forward link format indicator (FLFI) indicates whether a virtual subframe is, from the perspective of the transmitter, a forward link subframe (FLSF) or a SSF; if the receiver was expecting a SSF and the FLFI indicates a FLSF, then the receiver may wait until the next HARQ request from the transmitter in order to determine the next SSF; if the receiver was expecting a FLSF and the FLFI indicates a SSF, then the receiver may provide the HARQ status for the active HARQ processes that it is aware of while setting the status of the other processes to the default NAK value; the receiver may also provide other receiver control information (e.g. CSI) and set the reverse link format indicator (RLFI) appropriately; if the transmitter signalled a SSF but receives no feedback in the reverse link period of that SSF, the Transmitter should interpret this as a NAK for all of its active HARQ processes and begin its retransmission process; the HARQ process number (PN) and sequence number (SN) accompanying each transmission may ensure resynchronisation of the HARQ processes.

In some scenarios, DD2D communications may occur when the devices participating in an IDS are operating outside the coverage area of a cellular network. In general, DD2D communications in these environments may be based on one of the following principles: centralised control, in which one of the devices provides coordination functions for all of the inter-device sessions operating within its domain; or session-based control, in which a device (usually the transmitter) may provide coordination functions only for a single inter-device session. In some embodiments, a PicoNet Controller (PNC) or Cluster Head (CH) may be elected from amongst the off-network devices to provide a timing reference for other devices within its domain and to manage the allocation of radio resources to those devices. A PNC or CH may be regarded as a "base station" for the purposes of this document and all of the mechanisms and procedures described previously for base stations may apply. In other embodiments, each IDS may provide its own timing reference and coordinate the use of radio resources within the IDS. The device currently operating in the transmitter role may, for example, be the designated controller for the IDS; when the role of transmitter changes to another device within the IDS, the newly-designated transmitter may also assume the role of controller for the IDS. In this environment, there may be no distinction between virtual and physical frames therefore there is a 1:1 mapping between virtual and physical subframes. As a consequence, there may also be no distinction between procedures based on virtual subframe timing and those based on physical subframe timing.

In contrast to D2D control information exchange via a Base Station, the embodiments described in this document may decrease the volume of control traffic on both the uplink and downlink, decrease the delay between sending control information from one wireless device and receiving that information at the other device, and decrease the processing burden on the base station. These embodiments may also provide solutions for DD2D control information exchange that are common regardless of whether the communicating devices are served by one base station or are served by different base stations. In addition, these embodiments may be used in both point-to-point and point-to-multipoint transmission topologies.

Figure 12:
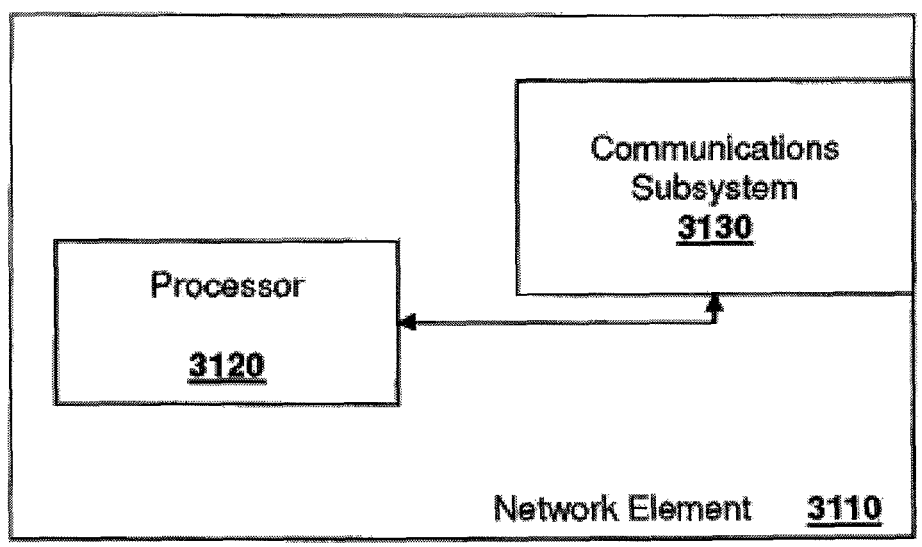
FIG. 12 is a diagram of a simplified network element.

Certain embodiments above may comprise a network element (e.g. base station). A simplified network element is shown with regard to FIG. 12. In FIG. 12, network element 3110 includes a processor 3120 and a communications subsystem 3130, where the processor 3120 and communications subsystem 3130 cooperate to perform the methods described above.

Further, certain embodiments may comprise a UE. One exemplary device is described below with regard to FIG. 13. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 can include a USB port or other port known to those in the art.

Figure 13:
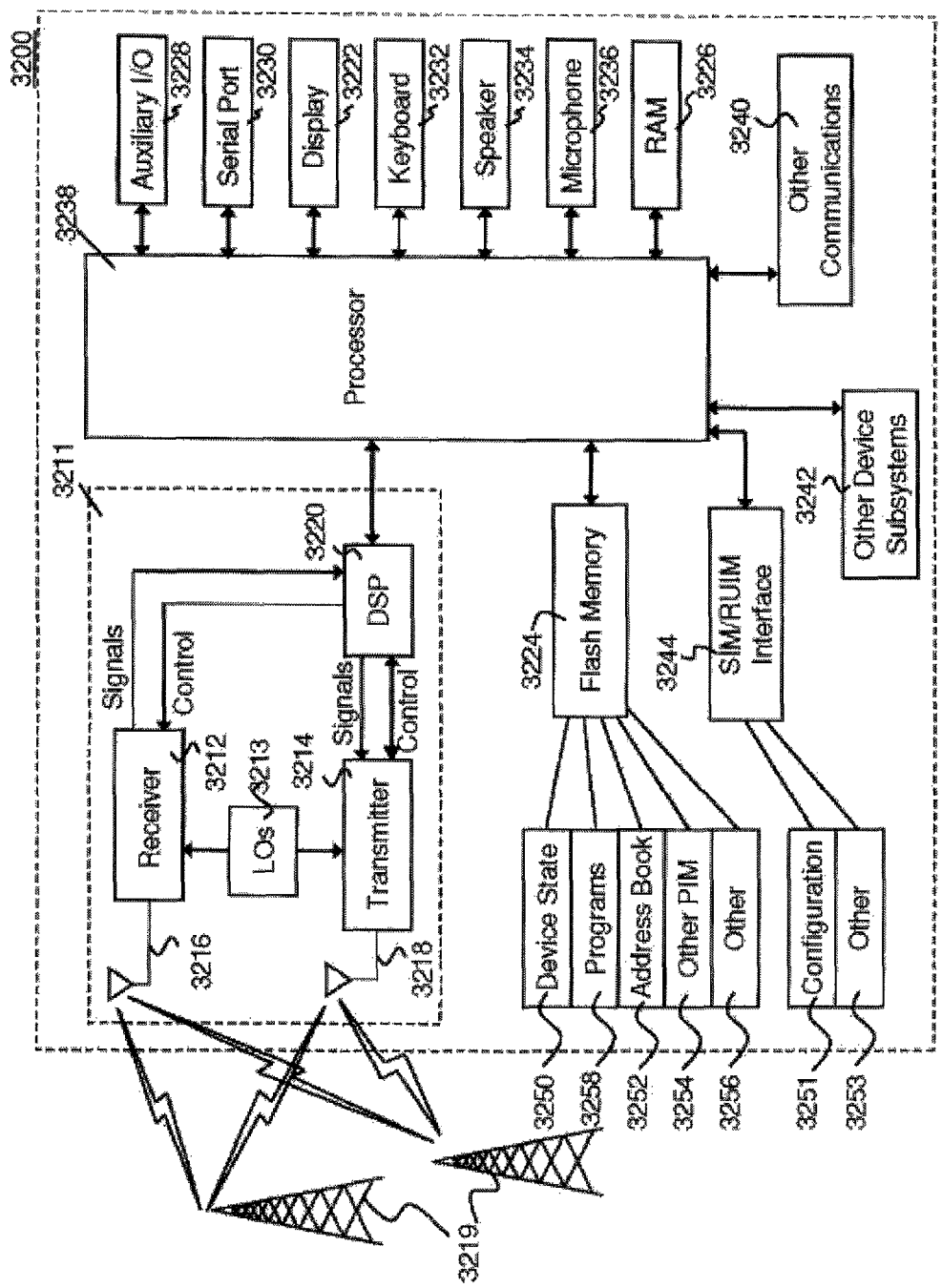
FIG. 13 is a diagram of a user equipment.

Some of the subsystems shown in FIG. 13 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications may be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or Alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 13 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The Alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 14:
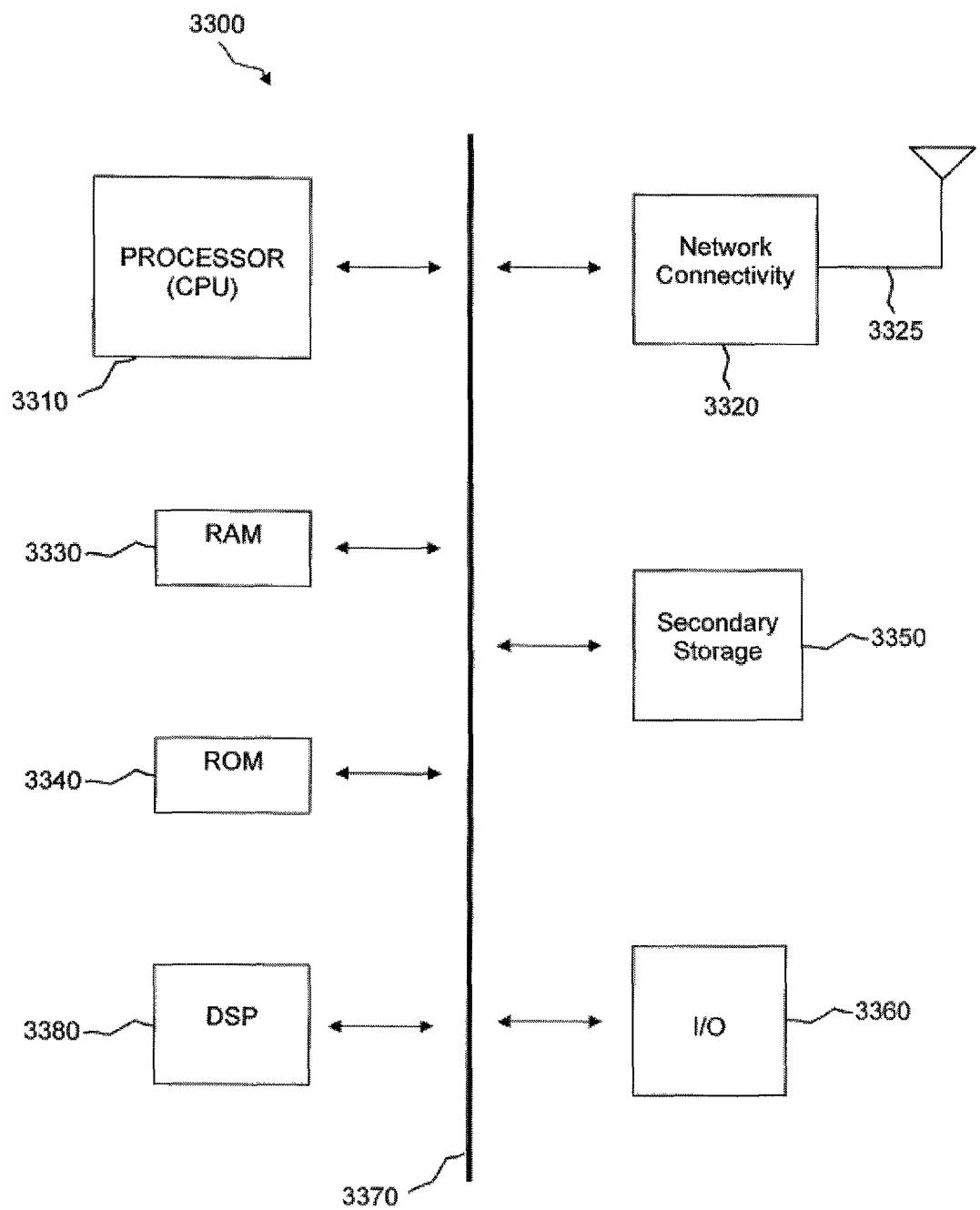
FIG. 14 is a diagram of a processing component.

The UE and other components described above might include a processing component that is capable of executing instructions related to the actions described above. As used herein, the term instructions may include reserved words which cause one or more processors to take certain computational, memory-related or control actions or to send computational, memory-related or control signals. As used herein, the term program may include a collection of computer instructions. FIG. 14 illustrates an example of a system 3300 that includes a processing component 3310 suitable for implementing one or more embodiments disclosed herein. The processing component 3310 may be substantially similar to the processor 3120 of FIG. 12 and/or the processor 3238 of FIG. 13.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips and may be a hardware device capable of executing computer instructions.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and Alterations are ascertainable by one skilled in the art and may be made without departing from the spirit and scope disclosed herein.

In some embodiments a user equipment may execute a method comprising: deriving a plurality of virtual subframes from an allocation of radio resources, the virtual subframes comprising a virtual special subframe and a virtual forward link subframe wherein the virtual forward link subframe comprises a first forward link portion and the virtual special subframe comprises one or more of: a second forward link portion, and a reverse link portion; receiving, via a direct device to device (DD2D) link, from a second user equipment during the first forward link portion and/or the second forward link portion; and transmitting, via the DD2D link, to the second user equipment during the reverse link portion. The method may further comprise mapping the plurality of virtual subframes to the allocation of radio resources, wherein the allocation is from a base station. The method may further comprise receiving an indicator to indicate whether one of the plurality of virtual subframes is a virtual special subframe or a virtual forward link subframe. The method may further comprise determining whether one of the plurality of virtual subframes is a virtual special subframe or a virtual forward link subframe based upon a time interval between the reception of the indicator and a subsequent allocation of radio resources by a base station. The method may further comprise determining whether one of the plurality of virtual subframes is a virtual special subframe or a virtual forward link subframe based upon a virtual subframe number (VSFN) associated with the one of the plurality of virtual subframes. The virtual special subframe may further comprise one or more of: a guard period before the reverse link portion; and a guard period after the reverse link portion. The first forward link portion and/or the second forward link portion may comprise a device to device data channel (DDDCH) and a transmitter control channel (TxCCH). The TxCCH may comprise transmitter reference signals (TRS) and transmitter control information (TxCI), the TxCI may comprise one or more of: a channel release indication, a channel state information (CSI) feedback request, a hybrid automatic repeat request (HARQ) feedback request, a HARQ process number, a HARQ data sequence number, a HARQ redundancy version, a modulation and coding scheme, or a receiver reference signal request. The first forward link portion and/or the second forward link portion may comprise a Forward Link Format Indicator (FLFI), the FLFI identifying TxCI elements included in the TxCCH. The first forward link portion and/or the second forward link portion may comprise a Forward Link Format Indicator (FLFI), the FLFI identifying one of the plurality of virtual subframes as either a virtual forward link subframe or a virtual special subframe. The reverse link portion may comprise a receiver control channel (RxCCH). The RxCCH may comprise receiver reference signals (RRS) and receiver control information (RxCI), the RxCI may comprise one or more of: a buffer status report, a channel access request indication, a channel release acknowledgement, a channel quality indication, a HARQ ACK/NACK indication, an imminent radio link failure indication, a transmit power control indicator, or a precoding matrix indicator. The reverse link portion may comprises a Reverse Link Format Indicator (RLFI), the RLFI identifying the RxCI elements included in the RxCCH. At least one of the user equipment and the second user equipment may be operating outside of a coverage area of a cellular network.

In some embodiments a user equipment may comprise a processor configured to: derive a plurality of virtual subframes from an allocation of radio resources, the virtual subframes comprising a virtual special subframe and a virtual forward link subframe wherein the virtual forward link subframe comprises a first forward link portion and the virtual special subframe comprises one or more of: a second forward link portion, and a reverse link portion; receive, via a direct device to device (DD2D) link, from a second user equipment during the first forward link portion and/or the second forward link portion; and transmit, via the DD2D link, to the second user equipment during the reverse link portion. The processor may be further configured to map the plurality of virtual subframes to the allocation of radio resources, wherein the allocation is from a base station. The processor may be further configured to receive an indicator to indicate whether one of the plurality of virtual subframes is a virtual special subframe or a virtual forward link subframe. The processor may be further configured to determine whether one of the plurality of virtual subframes is a virtual special subframe or a virtual forward link subframe based upon a time interval between the reception of the indicator and a subsequent allocation of radio resources by a base station. The processor may be further configured to: determine whether one of the plurality of virtual subframes is a virtual special subframe or a virtual forward link subframe based upon a virtual subframe number (VSFN) associated with the one of the plurality of virtual subframes. The virtual special subframe may further comprise one or more of: a guard period before the reverse link portion; and a guard period after the reverse link portion. The first forward link portion and/or the second forward link portion may comprise a device to device data channel (DDDCH) and a transmitter control channel (TxCCH). The TxCCH may comprise transmitter reference signals (TRS) and transmitter control information (TxCI), the TxCI may comprise one or more of: a channel release indication, a channel state information (CSI) feedback request, a hybrid automatic repeat request (HARQ) feedback request, a HARQ process number, a HARQ data sequence number, a HARQ redundancy version, a modulation and coding scheme, or a receiver reference signal request. The first forward link portion and/or the second forward link portion may comprise a Forward Link Format Indicator (FLFI), the FLFI identifying TxCI elements included in the TxCCH. The FLFI may identify one of the plurality of virtual subframes as either a virtual forward link subframe or a virtual special subframe. The reverse link portion may comprise a receiver control channel (RxCCH). The RxCCH may comprise receiver reference signals (RRS) and receiver control information (RxCI), the RxCI may comprise one or more of: a buffer status report, a channel access request indication, a channel release acknowledgement, a channel quality indication, a HARQ ACK/NACK indication, an imminent radio link failure indication, a transmit power control indicator, or a precoding matrix indicator. The reverse link portion may comprise a Reverse Link Format Indicator (RLFI), the RLFI identifying the RxCI elements included in the RxCCH. At least one of the user equipment and the second user equipment may operate outside of a coverage area of a cellular network.

What is claimed is:

1. A method in a user equipment, the method comprising:
deriving a plurality of virtual subframes from an allocation of radio resources, the virtual subframes comprising a virtual special subframe and a virtual forward link subframe wherein the virtual forward link subframe comprises a first forward link portion and the virtual special subframe comprises one or more of: a second forward link portion, and a reverse link portion, wherein at least one of the first forward link portion or the second forward link portion comprises a device to device data channel (DDDCH) and a transmitter control channel (TxCCH), wherein at least one of the first forward link portion or the second forward link portion comprises a Forward Link Format Indicator (FLFI), the FLFI identifying transmitter control information (TxCI) elements included in the TxCCH;
transmitting, via a direct device to device (DD2D) link, to a second user equipment during the first forward link portion, the second forward link portion, or both;
receiving, via the DD2D link, from the second user equipment during the reverse link portion;

transmitting an indicator to indicate whether one of the plurality of virtual subframes is a virtual special subframe or a virtual forward link subframe; and determining whether one of the plurality of virtual subframes is a virtual special subframe or a virtual forward link subframe based upon a time interval between the transmission of the indicator and a subsequent allocation of radio resources by a base station.

2. The method of claim 1, further comprising:
mapping the plurality of virtual subframes to the allocation of radio resources, wherein the allocation is from a base station.

3. The method of claim 1, wherein the virtual special subframe further comprises one or more of:
a guard period before the reverse link portion; and
a guard period after the reverse link portion.

4. The method of claim 1, wherein the TxCCH comprises transmitter reference signals (TRS) and TxCI, the TxCI comprising one or more of: a channel release indication, a channel state information (CSI) feedback request, a hybrid automatic repeat request (HARQ) feedback request, a HARQ process number, a HARQ data sequence number, a HARQ redundancy version, a modulation and coding scheme, or a receiver reference signal request.

5. The method of claim 1, wherein at least one of the first forward link portion or the second forward link portion comprises a Forward Link Format Indicator (FLFI), the FLFI identifying one of the plurality of virtual subframes as either a virtual forward link subframe or a virtual special subframe.

6. The method of claim 1, wherein the reverse link portion comprises a receiver control channel (RxCCH).

7. The method of claim 6, wherein the RxCCH comprises receiver reference signals (RRS) and receiver control information (RxCI), the RxCI comprising one or more of: a buffer status report, a channel access request indication, a channel release acknowledgement, a channel quality indication, a HARQ ACK/NACK indication, an imminent radio link failure indication, a transmit power control indicator, or a precoding matrix indicator.

8. The method of claim 7, wherein the reverse link portion comprises a Reverse Link Format Indicator (RLFI), the RLFI identifying the RxCI elements included in the RxCCH.

9. The method of claim 1, further comprising:
transmitting, via the direct device to device (DD2D) link, to a third user equipment during the first forward link portion or the second forward link portion; and
receiving, via the DD2D link, from the third user equipment during a second reverse link portion of a second virtual special subframe.

10. The method of claim 1, wherein at least one of the user equipment or the second user equipment is operating outside of a coverage area of a cellular network.

11. A user equipment comprising:
a processor configured to derive a plurality of virtual subframes from an allocation of radio resources, the virtual subframes comprising a virtual special subframe and a virtual forward link subframe wherein the virtual forward link subframe comprises a first forward link portion and the virtual special subframe comprises one or more of: a second forward link portion, and a reverse link portion, wherein at least one of the first forward link portion or the second forward link portion comprises a device to device data channel (DDDCH) and a transmitter control channel (TxCCH), wherein at least one of the first forward link portion or the second forward link portion comprises a Forward Link Format Indicator (FLFI), the FLFI identifying transmitter control information (TxCI) elements included in the TxCCH;
a transmitter configured to transmit, via a direct device to device (DD2D) link, to a second user equipment during the first forward link portion, the second forward link portion, or both;
a receiver configured to receive, via the DD2D link, from the second user equipment during the reverse link portion;
wherein the transmitter is further configured to transmit an indicator to indicate whether one of the plurality of virtual subframes is a virtual special subframe or a virtual forward link subframe; and
wherein the processor is further configured to determine whether one of the plurality of virtual subframes is a virtual special subframe or a virtual forward link subframe based upon a time interval between the transmission of the indicator and a subsequent allocation of radio resources by a base station.

12. The user equipment of claim 11, wherein the processor is further configured to:
map the plurality of virtual subframes to the allocation of radio resources, wherein the allocation is from a base station.

13. The user equipment of claim 11, wherein the virtual special subframe further comprises one or more of:
a guard period before the reverse link portion; and
a guard period after the reverse link portion.

14. The user equipment of claim 11, wherein the TxCCH comprises transmitter reference signals (TRS) and TxCI, the TxCI comprising one or more of: a channel release indication, a channel state information (CSI) feedback request, a hybrid automatic repeat request (HARQ) feedback request, a HARQ process number, a HARQ data sequence number, a HARQ redundancy version, a modulation and coding scheme, or a receiver reference signal request.

15. The user equipment of claim 11, wherein the FLFI identifies one of the plurality of virtual subframes as either a virtual forward link subframe or a virtual special subframe.

16. The user equipment of claim 11, wherein the reverse link portion comprises a receiver control channel (RxCCH).

17. The user equipment of claim 11, wherein the RxCCH comprises receiver reference signals (RRS) and receiver control information (RxCI), the RxCI comprising one or more of: a buffer status report, a channel access request indication, a channel release acknowledgement, a channel quality indication, a HARQ ACK/NACK indication, an imminent radio link failure indication, a transmit power control indicator, or a precoding matrix indicator.

18. The user equipment of claim 17, wherein the reverse link portion comprises a Reverse Link Format Indicator (RLFI), the RLFI identifying the RxCI elements included in the RxCCH.

19. The user equipment of claim 11:
wherein the transmitter is further configured to transmit, via the direct device to device (DD2D) link, to a third user equipment during the first forward link portion or the second forward link portion; and
wherein the receiver is further configured to receive, via the DD2D link, from the third user equipment during a second reverse link portion of a second virtual special subframe.

20. The user equipment of claim 11, wherein at least one of the user equipment or the second user equipment is operating outside of a coverage area of a cellular network.

21. One or more non-transitory computer readable media storing instructions that when executed by one or more processors cause the one or more processors to:
- derive a plurality of virtual subframes from an allocation of radio resources, the virtual subframes comprising a virtual special subframe and a virtual forward link subframe wherein the virtual forward link subframe comprises a first forward link portion and the virtual special subframe comprises one or more of: a second forward link portion, and a reverse link portion, wherein at least one of the first forward link portion or the second forward link portion comprises a device to device data channel (DDDCH) and a transmitter control channel (TxCCH), wherein at least one of the first forward link portion or the second forward link portion comprises a Forward Link Format Indicator (FLFI), the FLFI identifying transmitter control information (TxCI) elements included in the TxCCH;
- transmit, via a direct device to device (DD2D) link, to a second user equipment during the first forward link portion;
- receive, via the DD2D link, from the second user equipment during the reverse link portion;
- transmit an indicator to indicate whether one of the plurality of virtual subframes is a virtual special subframe or a virtual forward link subframe; and
- determine whether one of the plurality of virtual subframes is a virtual special subframe or a virtual forward link subframe based upon a time interval between the transmission of the indicator and a subsequent allocation of radio resources by a base station.

* * * * *